US012243111B2

(12) United States Patent
Xie et al.

(10) Patent No.: US 12,243,111 B2
(45) Date of Patent: Mar. 4, 2025

(54) OBJECT ACCOUNT GROUPING METHOD AND APPARATUS

(71) Applicant: TENCENT TECHNOLOGY (SHENZHEN) COMPANY LIMITED, Guangdong (CN)

(72) Inventors: Meihua Xie, Guangdong (CN); Gang Ling, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 248 days.

(21) Appl. No.: 17/963,273

(22) Filed: Oct. 11, 2022

(65) Prior Publication Data
US 2023/0034924 A1 Feb. 2, 2023

Related U.S. Application Data

(63) Continuation of application No. PCT/CN2022/079317, filed on Mar. 4, 2022.

(30) Foreign Application Priority Data

Mar. 4, 2021 (CN) .......................... 202110240829.9

(51) Int. Cl.
*G06Q 30/00* (2023.01)
*G06F 3/04817* (2022.01)
*G06Q 50/00* (2024.01)

(52) U.S. Cl.
CPC ......... *G06Q 50/01* (2013.01); *G06F 3/04817* (2013.01)

(58) Field of Classification Search
None
See application file for complete search history.

(56) References Cited

U.S. PATENT DOCUMENTS

| 2014/0237384 | A1* | 8/2014 | Zou ....................... H04L 51/046 |
| | | | 715/752 |
| 2018/0032222 | A1* | 2/2018 | Wang ....................... G06F 16/00 |
| 2018/0349416 | A1* | 12/2018 | Circlaeys ................ G06F 16/48 |
| 2019/0253430 | A1* | 8/2019 | Gamache .............. H04L 63/104 |

(Continued)

OTHER PUBLICATIONS

Communication rules and processes of knowledge-sharing in a high technology organization, Author: Nino, David, Publication info: The University of Texas at Austin. ProQuest Dissertations & Theses, 2002. (Year: 2002).*

(Continued)

*Primary Examiner* — Matthew T Sittner
(74) *Attorney, Agent, or Firm* — Crowell & Moring LLP

(57) ABSTRACT

This disclosure relates to an object account grouping method and apparatus. The method includes: displaying aggregation information corresponding to at least one object account, the aggregation information including at least two dimensions of identity association information, such as identity information of the object account, chat information of a local object account and the object account, and interaction information of the object account and the local object account in a social circle; determining, in response to a group selection operation triggered for the aggregation information on a selection control of a group tag, a target group to which a target object account in the at least one object account belongs; and adding the target object account to the target group.

19 Claims, 15 Drawing Sheets

(56) References Cited

U.S. PATENT DOCUMENTS

| | | | |
|---|---|---|---|
| 2021/0120073 A1* | 4/2021 | Qu | G06F 16/168 |
| 2021/0168456 A1* | 6/2021 | Yan | H04N 21/4532 |
| 2022/0076489 A1* | 3/2022 | Mishra | G06V 20/00 |

OTHER PUBLICATIONS

Collaborative Communication Interruption Management System (C-CIMS): Modeling Interruption Timings via Prosodic and Topic Modeling for Human-Machine Teams, Author: Peters, Nia S., Publication info: Carnegie Mellon University. ProQuest Dissertations & Theses, 2017. (Year: 2017).*

Administrative support of novice science teachers: A multiple case study, Author: Iacuone, Leann, Publication info: Clemson University, ProQuest Dissertations & Theses, 2015. (Year: 2015).*

Change a Light, Change the World Bus Tour: A communication audit, Author: McGinnis, Ann E., Publication info: The University of North Carolina at Chapel Hill. ProQuest Dissertations & Theses, 2008. (Year: 2008).*

\* cited by examiner

OBJECT ACCOUNT GROUPING METHOD AND APPARATUS

RELATED APPLICATION

This application is a continuation application of PCT Patent Application No. PCT/CN2022/079317, filed on Mar. 4, 2022, which claims priority to Chinese Patent Application No. 202110240829.9, entitled "OBJECT ACCOUNT GROUPING METHOD AND APPARATUS, DEVICE, AND STORAGE MEDIUM", and filed on Mar. 4, 2021, wherein the content of each of the above-referenced applications is incorporated herein by reference in its entirety.

FIELD OF THE TECHNOLOGY

This disclosure relates to the field of human-computer interaction, and in particular, to an object account grouping method and apparatus, a device, and a storage medium.

BACKGROUND OF THE DISCLOSURE

A user can perform grouping on a target user account in a social application program.

The user determines, by viewing the profile of the target user account, identity information represented by the target user account, and according to the identity information of the target user account, performs grouping on the target user account. In the related art, the process of performing grouping on the target user account by the user is as follows: clicking a group creation control (the group creation control is generally in a friend list) to enter a grouping interface; displaying, by the social disclosure program, the friend list; selecting, by the user, the target user account from the friend list; and adding the target user account to a created group, such as a colleague group.

In the aforementioned technical solution, when the user has many target user accounts in the social disclosure program, the identity of a friend cannot be determined only by distinguishing the target user accounts, so that the user needs to exit the grouping interface, and after determining the identity information represented by the target user accounts, re-enters the grouping interface to perform a grouping operation. Therefore, the operation steps are complex, and the efficiency of grouping the target user account is low.

SUMMARY

Embodiments of this disclosure provide an object account grouping method and apparatus, a device, and a storage medium. The technical solutions include the following solutions.

According to one aspect of this disclosure, an object account grouping method is provided. The method includes the following steps:

displaying aggregation information corresponding to at least one object account, the aggregation information including at least two dimensions of identity association information, and the identity association information being used for identifying identity information associated with the object account;

determining, in response to a grouping operation triggered for the aggregation information corresponding to a target object account in the at least one object account, a target group to which the target object account belongs; and adding the target object account to the target group.

According to another aspect of this disclosure, an object account grouping apparatus is provided. The apparatus includes a memory operable to store computer-readable instructions and a processor circuitry operable to read the computer-readable instructions. When executing the computer-readable instructions, the processor circuitry is configured to:

display aggregation information corresponding to at least one object account, the aggregation information including at least two dimensions of identity association information, and the identity association information being for identifying identity information associated with the object account;

determine, in response to a grouping operation triggered for the aggregation information corresponding to a target object account in the at least one object account, a target group to which the target object account belongs; and add the target object account to the target group.

According to another aspect of this disclosure, a computer-readable storage medium is provided, storing a computer program, the computer program, when executed by a processor, implementing the object account grouping method according to the foregoing aspect.

According to another aspect of this disclosure, a non-transitory machine-readable media storing instructions is provided. When being executed, the instructions is configured to cause a machine to:

display aggregation information corresponding to at least one object account, the aggregation information including at least two dimensions of identity association information, and the identity association information being for identifying identity information associated with the object account;

determine, in response to a grouping operation triggered for the aggregation information corresponding to a target object account in the at least one object account, a target group to which the target object account belongs; and add the target object account to the target group.

The technical solutions provided in the embodiments of this disclosure include at least the following beneficial effects:

By aggregating and displaying at least two dimensions of identity association information corresponding to a user account, a user can view more comprehensive information (the aggregation information) of a same user account. When the user does not know a user identity represented by the user account, the user does not need to control a terminal to switch and display different user interfaces in different social functions, so as to view a plurality of kinds of identity association information of the user account on the user interface. Therefore, the steps of human-computer interaction are simplified, the human-computer interaction efficiency during grouping is improved, and the grouping efficiency is improved.

DESCRIPTION OF EMBODIMENTS

First, terms involved in the embodiments of this disclosure are introduced:

Instant messaging (IM) application program: an application program that achieves online chat and file transmission through an IM technology. The IM application program is used for two or more persons to send a text message and voice information, perform audio communication and video communication, and send a file in real time through a network. IM includes two architecture forms, that is, a C/S architecture and a B/S architecture. The C/S architecture is a client/server architecture, and the B/S architecture is a browser/server architecture. Under the C/S architecture, a user needs to install the client of the IM application program on a terminal to achieve real-time online communication with other users; and under the B/S architecture, the user does not need to install the client of the IM application program, and performs real-time online communication with other users through a browser.

Persistent connection: the persistent connection indicates that a plurality of data packets can be continuously sent on a piece of connection. During connection maintenance, if no data packet is sent, both parties need to send link detection packets. The persistent connection is used for frequent operations, point-to-point communication, and the case that the number of connections cannot be too many.

Cold boot: cold boot generally refers to a starting mode of a terminal. That is, a power supply of the terminal is turned off and then is restarted; after the terminal is subjected to cold boot, all data in an internal memory is lost, hardware is re-tested, and an operating system is started through a computer chip (a complementary metal oxide semiconductor (CMOS)). Embodiments of this disclosure use the application program an example for performing cold boot. The cold boot of the application program indicates that when the application program is started, a background of the terminal has no the process of the application program, and an operating system of the terminal may recreate a new process and allocate same to the application program. This cold boot is the cold boot of the application program.

Figure 1:
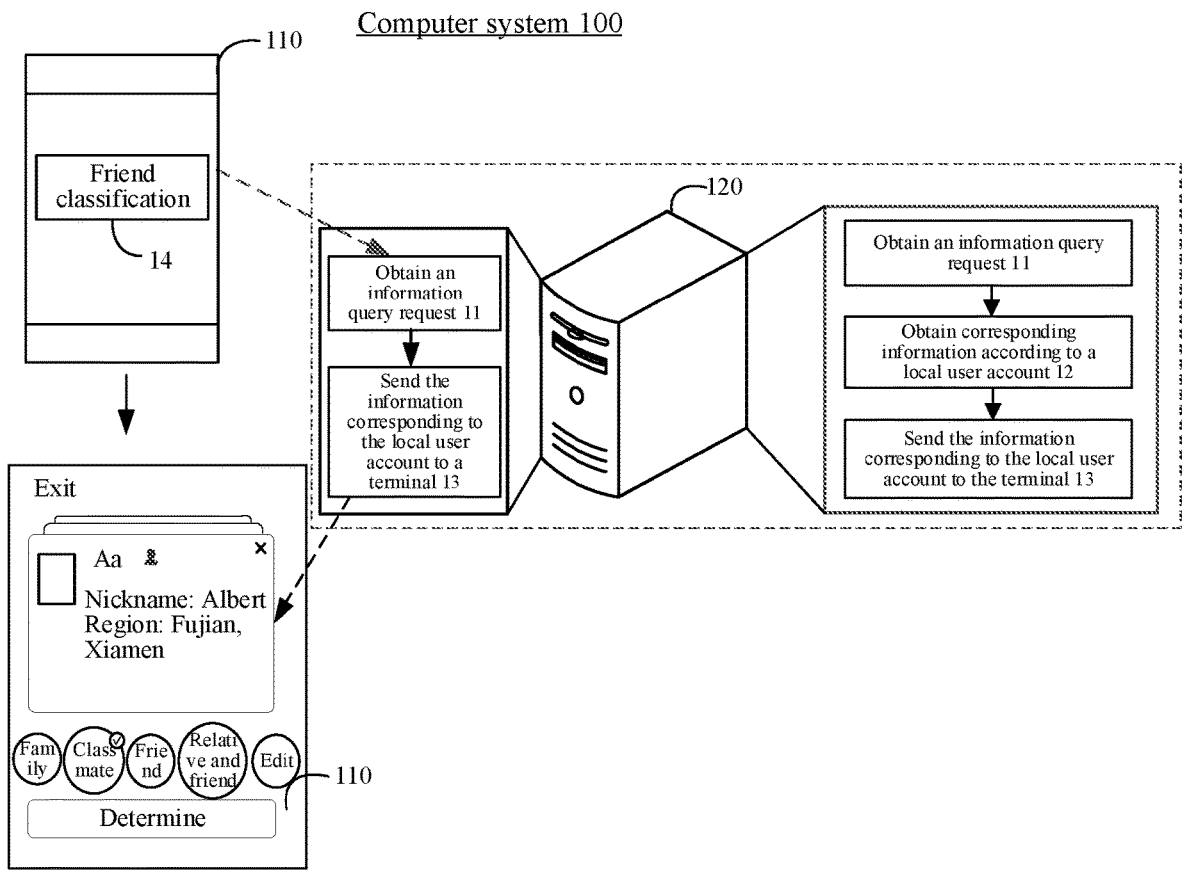
FIG. 1 is a block diagram of a computer system according to one exemplary embodiment of this disclosure.

FIG. 1 is a schematic diagram of a computer system according to one exemplary embodiment of this disclosure. The computer system 100 includes a terminal 110 and a server 120. The terminal 110 performs data communication with the server 120 through a communication network. Exemplarily, the communication network can be a wired network, and can also be a wireless network. Moreover, the communication network can be at least one of a local area network, a metropolitan area network, and a wide area network.

The application program is installed and run on the terminal 110. The application program supports the grouping of a user account (that is, an object account). The application program can be the IM application program, a social application program, a game application program, a shopping application program, a payment application program, a live broadcast application program, a music application program, a travel application program, a virtual reality (VR) application program, an augmented reality (AR) application program, etc., and can further be an application program in a terminal system, such as an address book application program. Exemplarily, the IM application program is installed in the terminal 110, and the user performs grouping on a friend through the IM application program.

In some embodiments, the terminal 110 may be a mobile terminal such as a smart phone, a smart watch, a tablet computer, a portable laptop computer, or an intelligent robot, or may be a terminal such as a desktop computer or a projection computer. This is not limited in this embodiment of this disclosure.

The server 120 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data an AI platform. In an implementation, the server 120 is a backend server of an application in the terminal 110.

As shown in FIG. 1, in this embodiment, the IM application program is run on the terminal 110. The IM application program displays a friend classification control 14. In some embodiments, the friend classification control 14 is also named as a friend grouping control. The embodiments of this disclosure do not limit the name of a control. The user clicks the friend classification control 14. The IM application program obtains a local user account (that is, a login account) corresponding to the user, and obtains, from a local cache of the terminal 110, a friend user account having a friend relationship with the local user account to display an aggregation information floating window of at least one friend user account. The aggregation information floating window includes the identity information of the friend user account, and displays a group tag control below the friend user account. The user determines the identity information of the friend user account according to the information displayed in the aggregation information floating window. A selection control of the group tag is selected according to the identity information. For example, the user clicks "a classmate tag control", and the IM application program divides the friend user account into a classmate group.

In some embodiments, after the user clicks the friend classification control 14, the IM application program further obtains a chat session record between the user account and the friend user account. In some cases, because the user deletes the chat session record or the user replaces a used terminal, the chat session record between the local user account and the friend user account cannot be found from the local cache. The IM application program sends an information query request to the server 120 to obtain the chat session record, and the information query request carries the local user account.

The server 120 is configured to perform the following steps: Step 11: Obtain the information query request. Step 12: Obtain corresponding information according to the local user account. Step 13: Send the information corresponding to the local user account to the terminal. The server 120 queries a corresponding chat session record according to the local user account carried in the information query request. The chat session record includes a single-user chat session record between the local user account and the at least one friend user account. The corresponding single-user chat session record, that is, the single-user chat session record between the local user account and the friend user account, is obtained from the chat session record according to the friend user account. The server 120 sends the single-user chat session record to the terminal 110.

The terminal 110 displays the single-user chat session record in the aggregation information floating window after receiving the single-user chat session record. The user can further determine the identity information of the friend on the basis of the single-user chat session to divide the friend into an appropriate group.

In another some embodiments, the aggregation information floating window further displays interaction information between the local user account and the friend user account in a social circle. The interaction information can be obtained from the local cache of the terminal 110, and can also be obtained from the server 120. The social circle is an online social circle that is composed of the user account and the friend user account thereof. The user account publishes information in the social circle, and the friend user account thereof can view the information published by the user account, and can perform at least one of a forwarding operation, a comment operation, a reply operation, and a like operation on the information.

In another some embodiments, the aggregation information floating window further displays a group chat session record. The group chat session record is a chat record in which the friend user account is associated with the local user account. For example, the friend user account mentions the local user account in a group chat session (mentioning refers to reminding, by "@" a target user account, the target user account to view information in the group chat session), or the local user account mentions the friend user account in the group chat session.

According to different information that the IM application program needs to obtain, the type of the information query request sent by the terminal 110 to the server 120 is different.

It can be understood that the aforementioned embodiments only relate to applying the object account grouping method to the IM application program of the terminal. In actual application, the aforementioned object account grouping method can further be applied to the social application program. In the social application program, the local user account and other user accounts have a one-way following relationship or a bidirectional following relationship. That is, the local user account can follow some user accounts, and can also be followed by some user accounts. For example, the local user account follows the user account 1, but the user account 1 does not follow the local user account; alternatively, the user account 1 follows the local user account, but the local user account does not follow the user account 1; alternatively, the user account 1 and the local user account follow each other. Exemplarily, the social application program displays the aggregation information floating window of the target user account according to followed information corresponding to the local user account. The embodiments of this disclosure do not limit this.

For ease of description, the following embodiments are described by using an example in which the object account grouping method is implemented by the terminal.

In the embodiments of this disclosure, the object account grouping method is applied to the IM application program. The user logs in the local user account in the IM application program, the local user account corresponds to a friend relationship list, and the friend relationship list includes at least one friend user account (the at least one friend user account includes the target user account). The user can divide friend user accounts into different groups, for example, dividing the friend user account 1 into the classmate group, and dividing the friend user account 2 into the colleague group. When dividing the friend user account, the user divides the friend user account into a corresponding group by determining the identity of the friend and a friend relationship.

Figure 2:
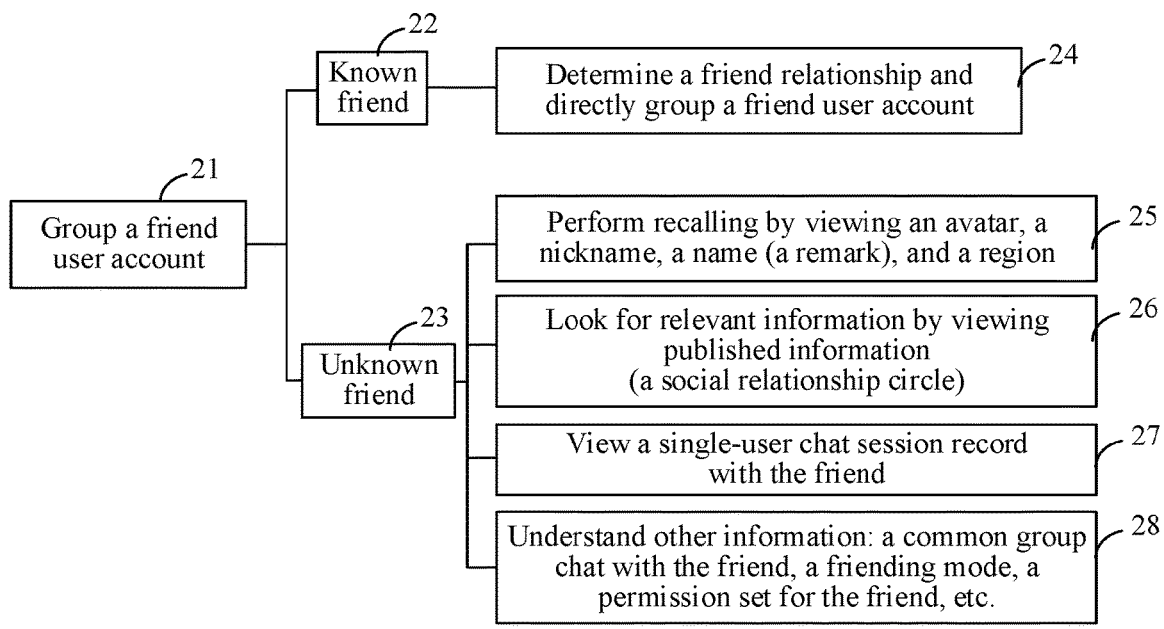
FIG. 2 is a flowchart of grouping a friend by a user according to one exemplary embodiment of this disclosure.

FIG. 2 is a flowchart of grouping a friend by a user according to one exemplary embodiment of this disclosure. A friend user account grouping process 21 includes the process of grouping a known friend 22 and an unknown friend 23 by the user.

When seeing the known friend 22, the user directly groups the friend user account 24 by determining the friend relationship. For example, the friend user account 1 is a relative of the user, and the user directly groups the friend user account 1 into a relative group. As another example, the friend user account 2 is a colleague of the user, and the user directly groups the friend user account 2 into the colleague group.

When seeing the unknown friend 23, the user needs to first determine the identity of the friend, and then groups the friend. The user can confirm the identity of the friend through the following four aspects:

first aspect 25: performing recalling by viewing an avatar, a nickname, a name (a remark), a region, and the user account;

second aspect 26: looking for relevant information by viewing published information (the social circle);

third aspect 27: viewing the single-user chat session record with the friend; and fourth aspect 28: understanding other information: a common group chat with the friend, a friending mode, a permission set for the friend, etc.

In some embodiments, the nickname of the friend is associated with the real name of the friend. Therefore, the user can determine the identity of the friend through the nickname of the friend. In another some embodiments, the avatar used by the friend is the real picture of the friend. Therefore, the user can determine the identity of the friend through the avatar of the friend. In another some embodiments, the user fills remark information when adding the friend, such as filling the real name of the friend in the remark information. Therefore, the user can determine the identity of the friend through the remark information. In another some embodiments, the user can determine the identity of the friend by integrating various information, such as the nickname of the friend, the avatar, the remark, the region, and the user account.

In another some embodiments, when the user cannot determine the identity of the friend through the basic information, such as the avatar of the friend, the nickname, and the region, the user can determine the identity of the friend by viewing the information published by the friend in the social circle. The social circle is a social relationship established between each user and a friend thereof. The user and the friend both can publish information, and the friend can view the information published by the user, make comments on the information, reply for the information, and perform a like operation on the information. For example, the information type of the information published by the friend is a picture, and the picture is the selfie of the friend, and then the user can determine the identity of the friend according to the information.

In another some embodiments, the user can further determine the identity information of the friend by viewing the single-user chat session record with the friend. For example, the single-user chat session record includes the self-introduction of the friend, and the user can determine the identity of the friend through the self-introduction of the friend.

In another some embodiments, the user can further determine the identity of the friend by viewing the common group chat with the friend. For example, the common group chat of the user and the friend is a colleague group chat, and then it can be preliminarily determined that the friend is a colleague of the user. In another some embodiments, the user determines the identity information of the friend by viewing the friending mode. For example, the user adds the friend B through the contact card of the friend B sent by the friend A, and therefore, the user can determine that the friend B is a friend of the friend A. In another some embodiments, the user integrates the information published by the friend, the single-user chat session record with the friend, the permission set for the friend, etc., to determine the identity of the friend.

An object in the embodiments of this disclosure refers to the user, and an object account refers to the user account.

It can be understood that the user can further determine the identity information of the friend through other modes. The embodiments of this disclosure do not limit this.

Figure 3:
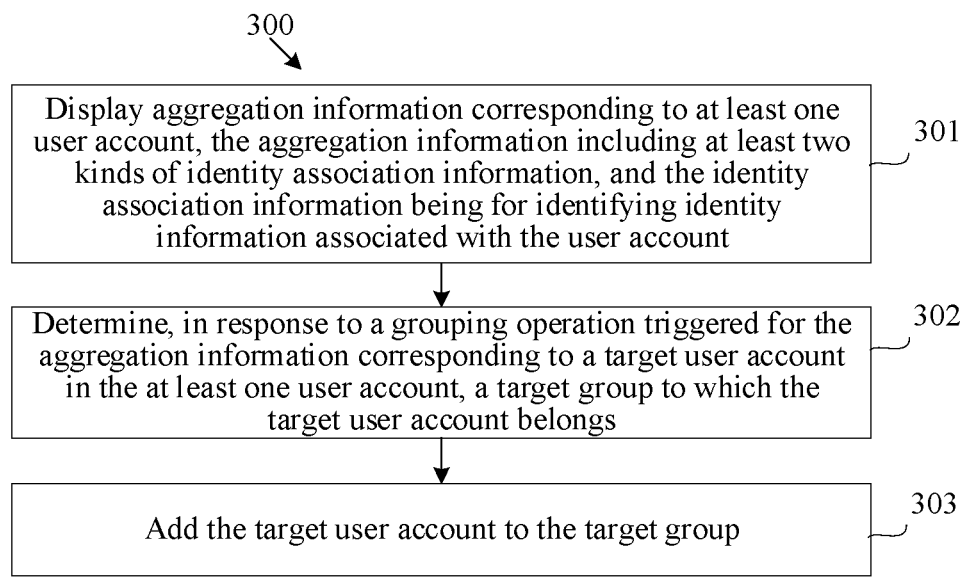
FIG. 3 is a flowchart of an object account grouping method according to one exemplary embodiment of this disclosure.

FIG. 3 is a flowchart of an object account grouping method 300 according to one exemplary embodiment of this disclosure. This embodiment is described by using an example in which the method is applied to the terminal 110 in the computer system 100 shown in FIG. 1. The method 300 includes the following step.

Step 301: Display aggregation information corresponding to at least one user account, the aggregation information including at least two dimensions of identity association information, and the identity association information being used for identifying identity information associated with the user account.

The aggregation information is obtained by aggregating the at least two dimensions of identity association information. The at least two dimensions of identity association information includes the identity association information in different social functions in a same application program or different application programs. Exemplarily, the aggregation information is displayed in a third-party application program (that is, an application program installed after being downloaded from an application store) in the terminal. Alternatively, the aggregation information is displayed in a preset application program, such as an address book program, in the operating system of the terminal. Exemplarily, the application program is the same application program, or the application program of a different type, or a different application program of a same type.

Figure 4:
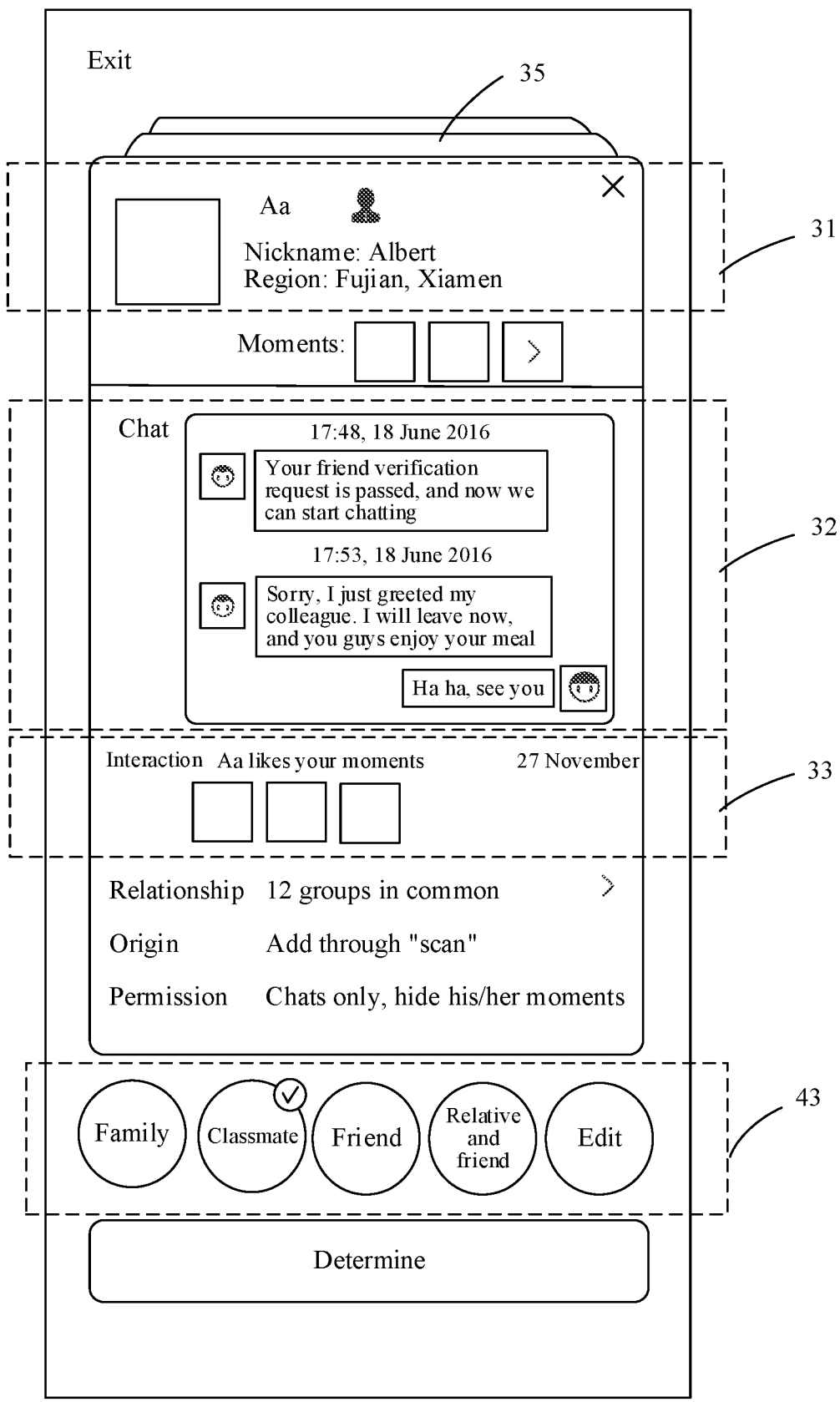
FIG. 4 is a schematic diagram of aggregation information corresponding to a user account according to one exemplary embodiment of this disclosure.

Exemplarily, the application program is the IM application program. In the IM application program, the user account is a friend user account having a friend relationship with the local user account (that is, the user account logged into the IM application program), and the aggregation information is information in a chat function and the interaction information in the social circle. As another example, the aggregation information is information after aggregating the information in the chat function, the interaction information in the social circle, and the identity information of the user account. As shown in FIG. 4, the aggregation information corresponding to the user account Aa is displayed in the terminal. The aggregation information includes the identity information 31 of the user account Aa, the chat information 32 of the local user account and the user account Aa, and the interaction information 33 of the user account Aa and the local user account in the social circle.

Exemplarily, the application program is a social sharing application program. In the social sharing application program, the user account is a user account followed by the local user account (that is, the user account logged into the social sharing application program). Alternatively, the user account is a user account that follows the local user account. Alternatively, the user account and the local user account follow each other. The aggregation information is the followed information (the number of following persons and the number of followed persons, etc.) of the user account and the information published by the user account.

Exemplarily, the application program is the address book program in the terminal. In the address book program, the user account is the name of a contact. The aggregation information is the telephone number of the contact and the information formed after aggregating a short message between the contact and the local user account (that is, a management account logged into the operating system of the terminal; through the management account, such as an Apple ID, the user can enjoy the service provided by a terminal provider).

The aggregation information in the aforementioned embodiments is the identity association information included in the different social functions in the different application programs. The identity association information is the identity information corresponding to the user account, and information generated in the process of performing an operation in the application program through the user account. Each kind of identity association information includes at least one kind of the identity information and the interaction information associated with the user account.

That is, the identity association information is relevant information used for representing the identity of the holder of the user account.

The aggregation information further includes the identity association information in the different social functions in different application programs of the same type. Exemplarily, the aggregation information includes the identity association information in the social circle in the IM application program 1 and the identity association information in a user space (that is, a space in which the user publishes information) in the IM application program 2. The identity association information is used for identifying the identity information related to the user account. The identity association information can be information representing a user identity, such as the user account, the user nickname, the user avatar, a personalized signature, a remark, a tag, a region, a mobile phone number, a friending mode (for example, QR code, "shake", and group chat), and permission information (such as chat permission, and a viewing permission for a motion state of the user). The identity association information can further be information generated in the process of interacting with the user account, such as chat session information, and the interaction information, the live broadcast interaction information, and the video interaction information in the social circle.

The identity association information in the different application programs is obtained by logging a relevant user account into the different application programs of the same type. Exemplarily, a first user account is logged into a first application program, and it can be authorized through the first user account to log in to a second application program. The second application program generates, for the user according to the first user account, a second user account suitable for the second application program. A second server corresponding to the second application program associates the second user account with the first user account. The second server is connected to a first server corresponding to the first application program through a network. When it is needed to obtain the identity association information of a same user in the second application program, the first application program sends an information acquisition request to the first server, the information acquisition request carries the first user account, the first server sends the information acquisition request to the second server, and the second server determines the second user account of the user in the second application program according to the first user account and an association relationship (being used for representing the association relationship between the first user account and the second user account), so as to obtain the identity association information corresponding to the second user account. The second server sends the identity association information corresponding to the second user account to the first server, and then sends, through the first server, the identity association information corresponding to the second user account to the first application program.

The aggregation information further includes the identity association information in the different social functions in different types of application programs. Exemplarily, the aggregation information includes the identity association information in the chat function in the IM application program 1 and the video interaction information in the social sharing application program. The video interaction information refers to information generated after a video is subjected to a video interaction operation in a video function page in the video application program or the IM application program. The video interaction operation includes at least one of the comment operation, the like operation, the forwarding operation, the favorite operation, and a reward operation. The reward operation indicates that the user pays a certain amount of virtual currency for the video, and the virtual currency is a video revenue of a video publisher and can be converted into real currency, such as a coin operation and a charging operation. The video interaction operation can be an interaction operation performed by a user corresponding to any user account on the video. For example, the video is the video A sent by the user a through the user account 1, and then the user a and the user b (using the user account 2) can respectively generate video interaction information for the video A through the user account 1 and the user account 2. Otherwise, the user b publishes the video B through the user account 2, and the user a and the user b respectively generate the video interaction information for the video B through the user account 1 and the user account 2.

By configuring an application programming interface (API) between a first-type application program and a second-type application program, the first-type application program obtains the identity association information in the second-type application program through the API. When it is needed to obtain the identity association information of the same user in the second-type application program, the first-type application program sends a data calling request to the second-type application program, and the data calling request carries the first user account (the first user account is associated with the second user account in the second-type application program). The data calling request is sent to the second-type application program through the API. The second-type application program obtains, according to the data calling request, the identity association information corresponding to the second user account, and through the API, sends the identity association information corresponding to the second user account to the first-type application program.

The user accounts in the first-type application program and the second-type application program are the user accounts of the same user, and the two user accounts are associated with each other. For example, the user authorizes the social sharing application program through the user account 1 logged into the IM application program, so as to log the user account 2 into the social sharing application program. The user account 2 is a user account that is generated by a social application program according to the user account 1 and satisfies the account type of the social application program. As another example, the user account 1 and the user account 2 are user accounts generated after performing registration through a same mobile phone number.

Step 302: Determine, in response to a grouping operation triggered for the aggregation information corresponding to the target user account in the at least one user account, a target group to which the target user account belongs.

The target user account is a subset of at least one user account, and the subset is a non-empty set. That is, the target user account includes at least one user account. Any user account in the at least one user account is the target user account. Exemplarily, the aggregation information corresponding to the target user account is located before the aggregation information corresponding to all the user accounts.

Exemplarily, when the terminal used by the user is provided with a touch display screen, for example, the terminal is a smart phone or a tablet computer, etc., a human-computer interaction operation includes a click operation, a double click operation (including a single-finger double click operation or a double-finger click operation), a long-press operation, a dragging operation, a sliding operation, a hovering operation, and a combination operation thereof.

Exemplarily, when the terminal used by the user is connected to an external input device, for example, the terminal is a notebook computer or a desktop computer, etc., the human-computer interaction operation includes an operation generated through the external input device, such as an operation generated by clicking a mouse by the user, or an operation generated by pressing a key of a keyboard by the user.

Grouping refers to classifying the user account according to an identity relationship and a closeness degree between the user represented by the user account and the user corresponding to the terminal. Exemplarily, the groups include the relative group, the classmate group, a friend group, the colleague group, and a client group, etc. The classmate group can further be divided into a high school classmate group and a college classmate group, etc. The user can set the groups. The embodiments of this disclosure do not limit the names of the groups.

The human-computer interaction operation associated with the aggregation information corresponding to the target user account (that is, the grouping operation triggered for the aggregation information corresponding to the target user account) includes at least one of the following operations: the human-computer interaction operation directly performed on the aggregation information corresponding to the user account, and the human-computer interaction operation performed on a control associated with the aggregation information. For example, the aggregation information corresponding to the user account includes the group tag control. The user clicks the group tag control that represents "classmate", and then selects the target group (that is, the classmate group) to which the target user account belongs.

Step 303: Add the target user account to the target group.

Exemplarily, the user account in the application program is displayed according to the group divided by the user. The target user account is in the target group. For example, the application program displays the classmate group and the colleague group, the classmate group includes the account 1 and the account 2, and the colleague group includes the account 3 and the account 4.

Exemplarily, the application program sorts and displays the user accounts according to the names of the user accounts. For example, the application program displays the account 1, the account 2, the account 3, and the account 4, and displays, in the identity information of the account 1, a group to which the account 1 belongs.

In some embodiments, step 301 is executed prior to step 302, or step 302 is executed prior to step 301, or step 301 and step 302 are simultaneously executed, or the aforementioned execution orders are executed in a mixed mode in a grouping process (including the process of grouping a plurality of user accounts).

Therefore, according to the method provided by the embodiments of this disclosure, by aggregating and displaying at least two dimensions of identity association information corresponding to the user account, the user can view more comprehensive information (the aggregation information) of the same user account. When the user does not know the user identity represented by the user account, the user does not need to control the terminal to switch and display the different user interfaces in the different social functions, so as to view a plurality of kinds of identity association information of the user account on the user interface. Therefore, the steps of human-computer interaction are simplified, the human-computer interaction efficiency during grouping is improved, and the grouping efficiency is improved.

Figure 5:
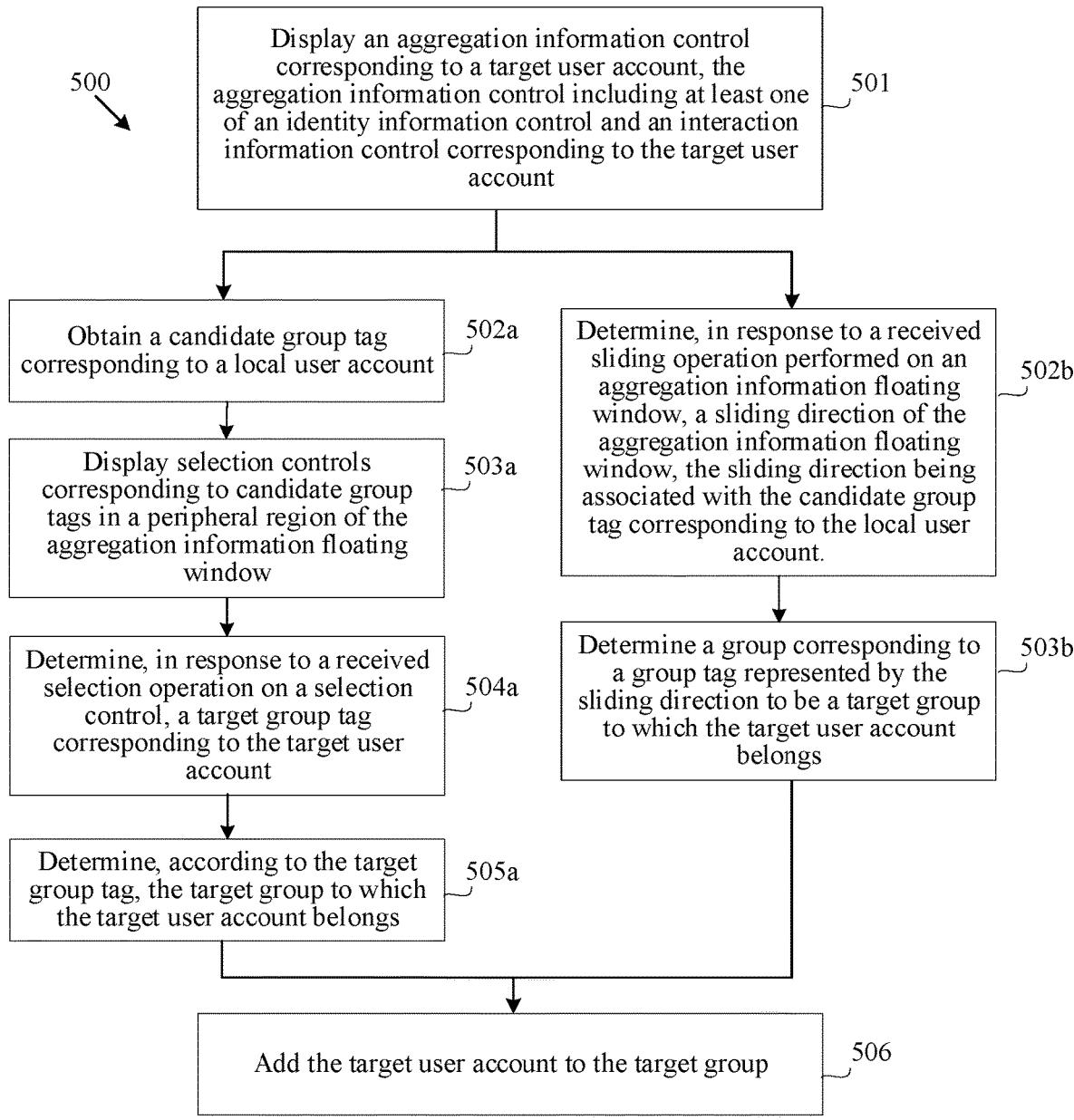
FIG. 5 is a flowchart of an object account grouping method according to another exemplary embodiment of this disclosure.

FIG. 5 is a flowchart of an object account grouping method 500 according to another exemplary embodiment of this disclosure. This embodiment is described by using an example in which the method 500 is applied to the terminal 110 in the computer system 100 shown in FIG. 1. The method 500 includes the following steps:

Step 501: Display an aggregation information control corresponding to the target user account, the aggregation information control including at least one of an identity information control and an interaction information control corresponding to the target user account.

Exemplarily, by using an example in which the target user account is grouped, the target user account is a user account displayed in the IM application program. The identity information control is used for displaying the identity information corresponding to the target user account, and the identity information is information used for representing the identity of the holder of the user account. The interaction information control is used for displaying the interaction information corresponding to the target user account, and the interaction information is the information of interaction between the user account and the target user account and/or other user accounts (the user accounts other than the target user account). The aggregation information includes the identity association information in different functions in the IM application program, and the identity association information in the different social functions in the IM application program includes at least two dimensions of the following information.

1. Identity Information of the User Account.

For example, the avatar of the target user account, the name (or the nickname), the remark, the region, the user account, the personalized signature, and the like.

2. A Single-User Chat Session Record Corresponding to the User Account and the Local User Account.

The single-user chat session record between the user represented by the target user account and the user represented by the user account logged into the IM application program.

3. A Group Chat Session Record Associated with the User Account.

The target user account and the local user account are in a same group chat session. The group chat session record associated with the target user account can be a group chat session record in which the target user account mentions the local user account, can also be a group chat session record in which the local user account mentions the target user account, and can further be a group chat session record in which the local user account and the target user account are simultaneously mentioned by another user account in the group chat session.

4. Interaction Information Between the User Account and the Local User Account in the Social Circle.

The interaction information refers to interaction information between the target user account and the local user account in the social circle. For example, the target user account publishes information in the social circle, and the user represented by the local user account makes comments on the information, forwards the information, and replies for the information, and likes the information, etc., and then the interaction information between the local user account and the target user account is generated. Conversely, the local user account publishes information, and the user represented by the target user account can also perform the aforementioned operations on the information. Exemplarily, the social circle is moments.

5. Video Interaction Information Associated with the User Account.

The video interaction information is information generated after a video is subjected to the video interaction operation in the video function page in the video application program or the IM application program. The video interaction operation includes at least one of the comment operation, the like operation, the forwarding operation, the favorite operation, and the reward operation. For example, the target user account publishes a short video, and the user represented by the local user account performs operations, such as comment, forwarding, reply, and like, on the short video, and then the interaction information between the local user account and the target user account is generated. Conversely, the local user account publishes a short video, and the user represented by the target user account can also perform the aforementioned operations on the short video. The video interaction information in the embodiments of this disclosure does not include browsing record information generated in the process of browsing the video by the user.

6. Live Broadcast Interaction Information Associated with the User Account.

The live broadcast interaction information refers to interaction information in a live broadcast function page in the live broadcast application program or the IM application program. For example, the target user account serves as an anchor to perform live broadcast, the user represented by the local user account performs operations, such as comment, forwarding, reply, like, and bullet curtain sending, on a live broadcast video, and then the interaction information between the local user account and the target user account is generated. Conversely, the local user account serves as an anchor to perform live broadcast, and the user represented by the target user account can also perform the aforementioned operations on the live broadcast video.

7. A Transaction Record Between the User Account and the Local User Account.

The transaction record refers to a transaction record generated when the target user account and the local user account perform resource transfer. Resources include a cash red packet, a coupon, a virtual gift, a score, game equipment, a virtual skin, and a virtual pet, etc. The embodiments of this disclosure do not limit a resource type.

At least one of the identity information control and the interaction information control is displayed on the aggregation information control corresponding to the target user account. The identity information control is configured to represent the identity information of the user account. The IM application program and the server keep persistent connection communication. When the local user account is an online state, the identity information corresponding to the target user account is synchronized to a client through the persistent connection. When the local user account is in an offline state, the user performs cold boot on the IM application program. The terminal performs query through the server corresponding to the IM application program, and updates the identity information of a local existing target user account.

The interaction information control includes multiple types of controls. The following description is made by using an example in which the interaction information control includes a chat record control, a group chat record control, and an association information interaction control.

1) The Interaction Information Control Includes the Chat Record Control.

Update and display, in response to a received sliding operation on the chat record control, the single-user chat session record corresponding to the target user account and the local user account.

Figure 6:
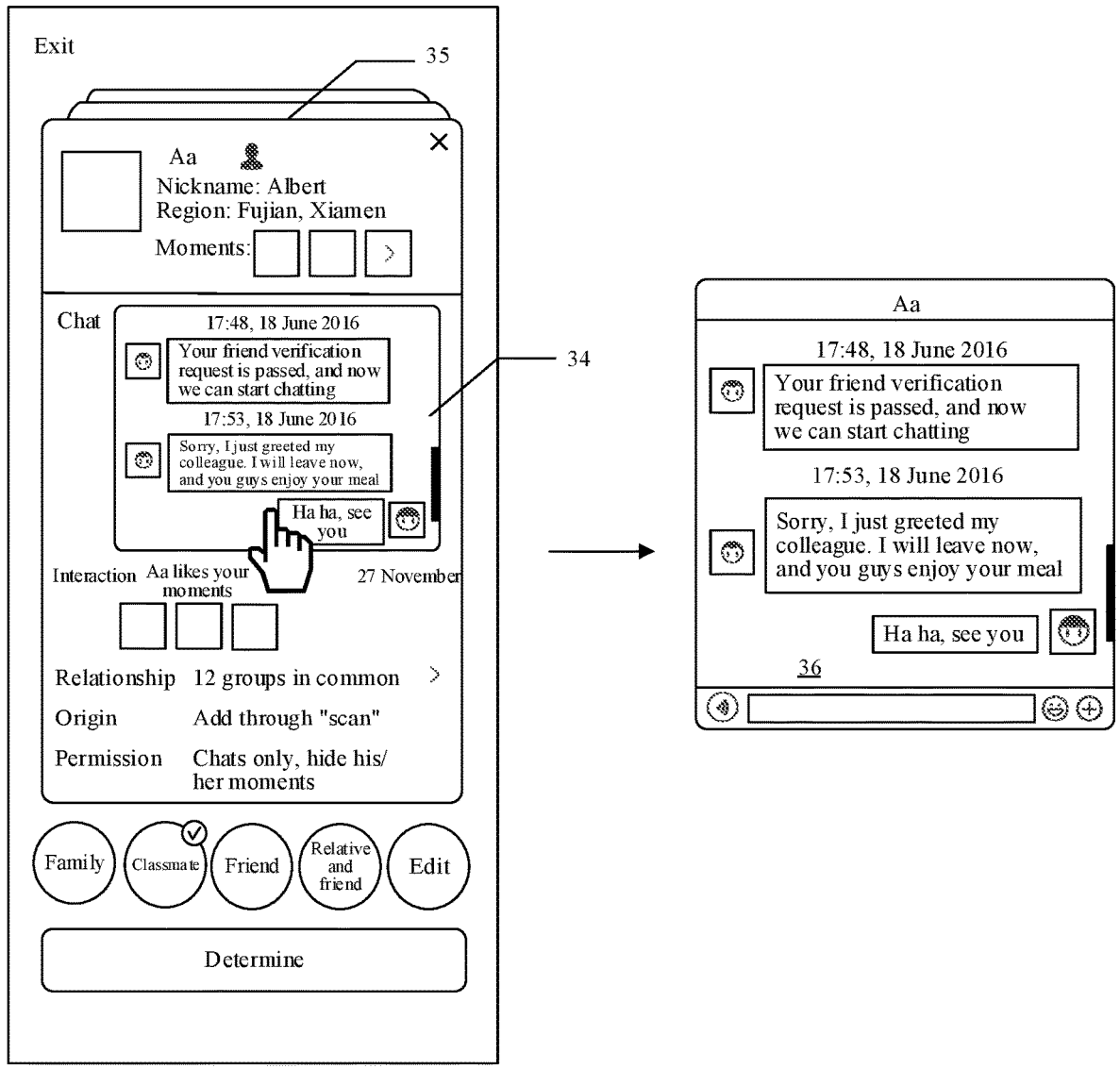
FIG. 6 is a schematic diagram of aggregation information corresponding to a user account according to another exemplary embodiment of this disclosure.

As shown in the left drawing of FIG. 6, the interaction information control is displayed on the aggregation information control. The interaction information control includes the chat record control 34. When the user slides the chat record control 34, the single-user chat session record between the target user account and the local user account is loaded and displayed. Exemplarily, the single-user chat session record preferentially displays a chat session record closest to a time when the user performs grouping, and by sliding a scroll bar upwards by the user, the earlier chat session records are gradually displayed.

The IM application program pulls the chat session record from the local cache of the terminal according to the local user account, and according to the target user account, searches the pulled chat record for the single-user chat session record corresponding to the target user account. The IM application program displays the chat record control according to the single-user chat session record.

In some embodiments, the user deletes or clears the chat record in the IM application program, or the user replaces the IM application program used by the terminal, or the user logs a same local user account into a plurality of terminals. In this case, the chat session record cannot be obtained from the local cache according to the local user account. The terminal sends a chat record query request carrying the local user account to the server corresponding to the IM application program, the server queries a corresponding chat session record according to the local user account and sends the chat session record to the terminal, and the IM application program obtains, according to the target user account, the single-user chat session record between the target user account and the local user account from the chat session record, and displays the chat record control according to the single-user chat session record.

Switch, in response to a received switching operation on the chat record control, the aggregation information floating window corresponding to the target user account to display a chat session interface corresponding to the target user account and the local user account.

Exemplarily, the switching operation includes at least one of the click operation, the double click operation (including the single-finger double click operation and the double-finger click operation), the long-press operation, the dragging operation, the sliding operation, the hovering operation, and the combination operation thereof. As shown in the right drawing of FIG. 6, the IM application program displays the aggregation information floating window 35 corresponding to the target user account. The aggregation information floating window includes the chat record control 34. When the user clicks the chat record control 34, a chat session interface 36 corresponding to the target user account and the local user account is switched and displayed.

2) The Interaction Information Control Includes the Group Chat Record Control.

Update and display, in response to a received sliding operation on the group chat record control, the group chat session record associated with the target user account and the local user account.

Figure 7:
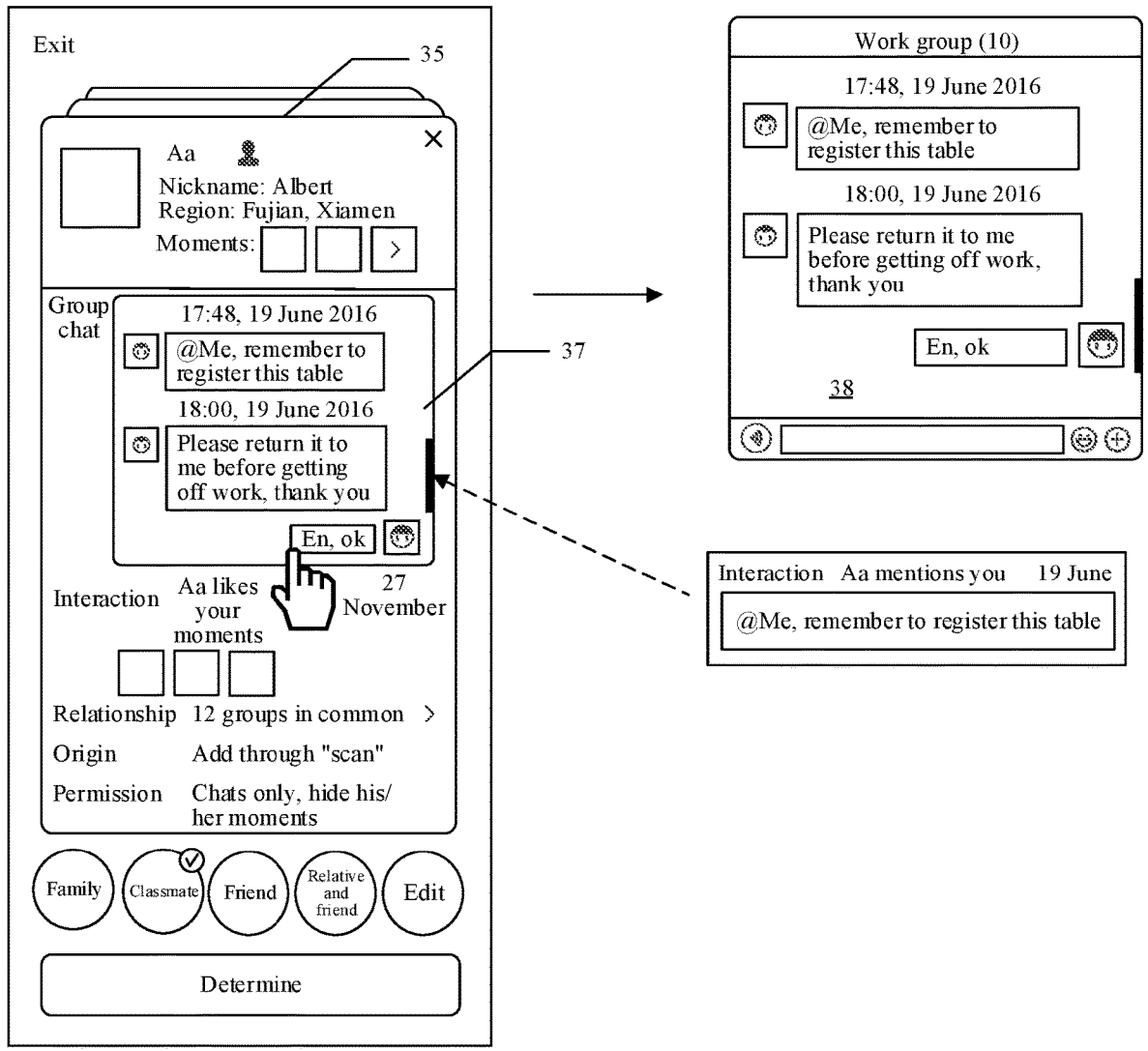
FIG. 7 is a schematic diagram of aggregation information corresponding to a user account according to another exemplary embodiment of this disclosure.

As shown in the left drawing of FIG. 7, the interaction information control is displayed on the aggregation information control. The interaction information control includes the group chat record control 37. When the user slides the group chat record control 37, the group chat session record associated with the target user account and the local user account is loaded and displayed. The group chat session record is a chat record of a group with the group chat name being a work group. The group chat session record displays a chat record that the target user account mentions the local user account. Exemplarily, the group chat session record preferentially displays a group chat session record closest to a time when the user account performs grouping and associated with the target user account, and by sliding the scroll bar upwards by the user, the earlier group chat session records are gradually displayed.

The IM application program pulls the group chat session record from the local cache of the terminal according to the local user account, and according to the target user account, searches the pulled group chat session record for the group chat session record associated with the target user account. The IM application program displays the group chat record control according to the group chat session record.

In some embodiments, the terminal can send a group chat record query request carrying the local user account to the server corresponding to the IM application program, the server obtains group chat record information according to the local user account and sends the group chat record information to the terminal, and the IM application program obtains the group chat session record associated with the target user account from the group chat record information according to the target user account. The amount of data that the server needs to query is large due to the uncertainty of group history messages of a common group chat. Therefore, in some embodiments, the group chat session record associated with the target user account cannot be obtained from the local cache of the terminal, and then the terminal cannot send the group chat record query request to the server.

Switch, in response to a received switching operation on the group chat record control, the aggregation information floating window corresponding to the target user account to display a group chat session interface corresponding to the target user account and the local user account.

Exemplarily, the switching operation includes at least one of the click operation, the double click operation (including the single-finger double click operation and the double-finger click operation), the long-press operation, the dragging operation, the sliding operation, the hovering operation, and the combination operation thereof. As shown in the right drawing of FIG. 7, when the user clicks the group chat record control 37, the group chat session interface 38 associated with the target user account is switched and displayed. In some embodiments, the group chat session record control 37 is shown in the lower right drawing of FIG. 7, that is, only displaying reminding information when the target user account performs reminding.

3) The Interaction Information Control Includes the Association Information Interaction Control.

Switch, in response to a received switching operation on the association information interaction control, the aggregation information floating window to display a message list corresponding to association interaction information, the message list including the association interaction information of the target user account and the local user account in the social circle, and the association interaction information including at least one of reminding information, like information, comment information, and reply information.

Figure 8:
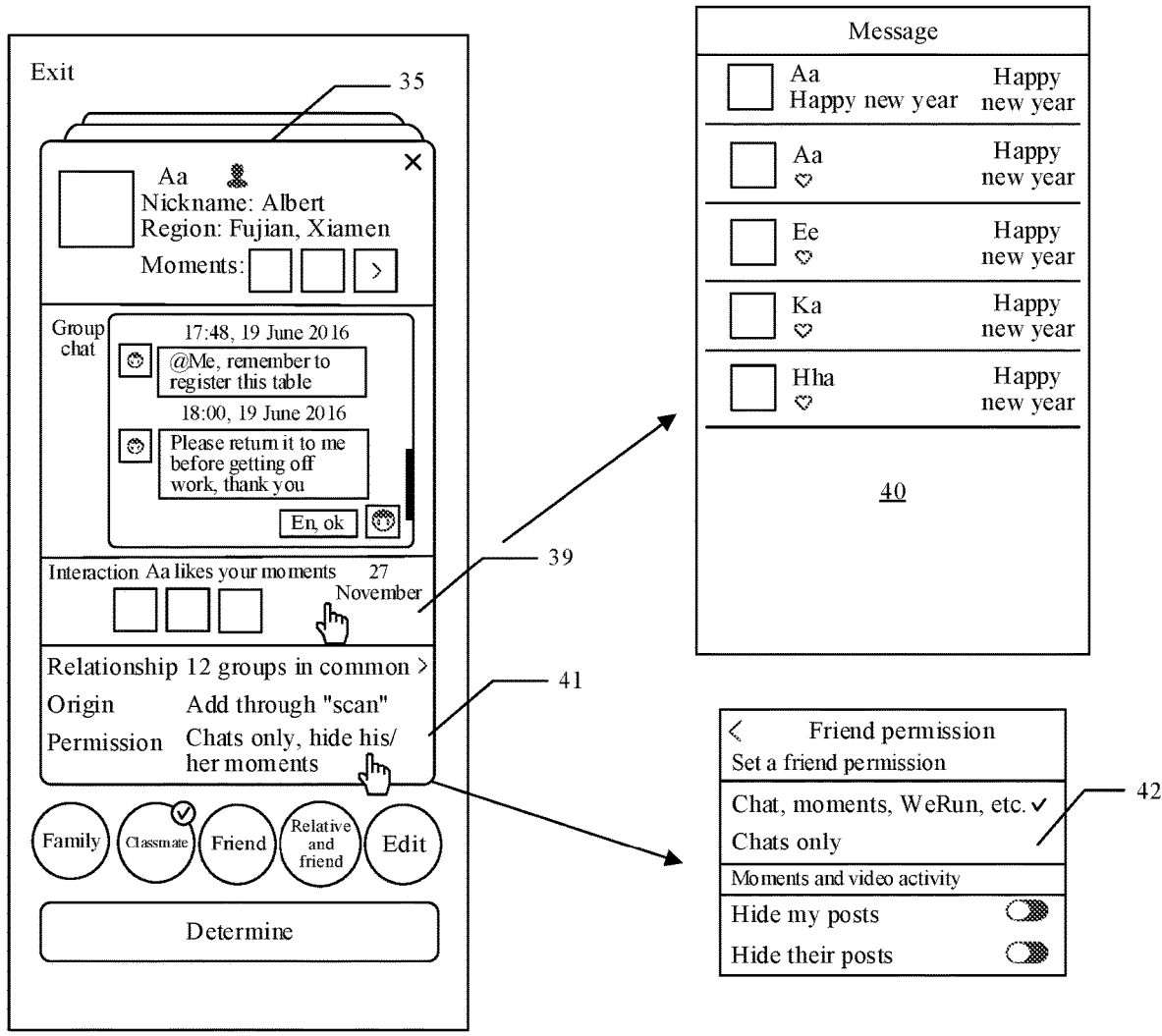
FIG. 8 is a schematic diagram of aggregation information corresponding to a user account according to another exemplary embodiment of this disclosure.

As shown in the left drawing of FIG. 8, the interaction information control is displayed on the aggregation information control. The interaction information control includes an association information control 39. When the user clicks the association information control 39, the aggregation information floating window 35 is switched to display a message list 40 corresponding to the association interaction information, as shown in the upper right drawing of FIG. 8. In the message list, one column at the left side is association interaction information generated by a plurality of user accounts, and one column at the right side is information published by the local user account in the social circle, and the user account Aa makes comments on the information and likes the information (a heart shape represents like).

In some embodiments, when the user clicks a permission control 41, the aggregation information floating window is switched to display a permission setting interface 42, as shown in the lower right drawing of FIG. 8. The user can set a permission for the target user account, so that a user corresponding to the target user account cannot view partial information. For example, the user 2 corresponding to the target user account cannot view the number of steps per day of the user 1 and the information published in the social circle.

Step 502*a*: Obtain a candidate group tag corresponding to the local user account.

The candidate group tag refers to the identification information of a candidate group. Exemplarily, the IM application program obtains the candidate group tags, such as a classmate tag, a colleague tag, a relative tag, and a friend tag, set by the local user account. In some embodiments, the local user account does not correspond to the candidate group tag, and obtains a candidate group tag preset by the IM application program. The IM application program corresponds to a tag group template. In another some embodiments, the user needs to temporarily and manually edit the candidate group tags during grouping.

Step 503*a*: Display selection controls corresponding to candidate group tags in a peripheral region of the aggregation information floating window.

The aggregation information corresponding to the target user account is displayed through the aggregation information floating window. The peripheral region of the aggregation information floating window includes at least one of a region above the aggregation information floating window, a region below aggregation information floating window, a region at the left side of the aggregation information, and a region at the right side of the aggregation information.

Figure 9:
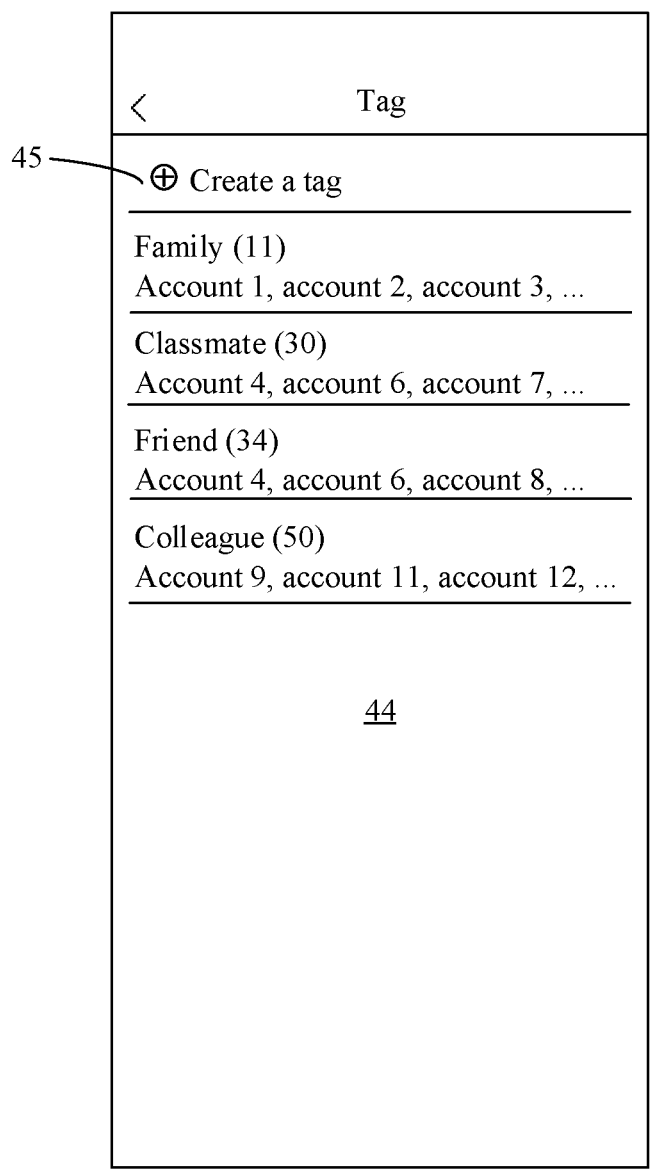
FIG. 9 is a schematic diagram of a group tag corresponding to a user account according to one exemplary embodiment of this disclosure.

As shown in FIG. 4, the selection control 43 is displayed below the aggregation information floating window 35. The selection control 43 includes a family tag control, a classmate tag control, a friend tag control, and a relative and friend tag control. The candidate group tag further includes an edition control, and the edition control is configured to group the tags. When the user clicks the edition control, a tag creation page 44 shown in FIG. 9 is displayed. A new group tag is created through a tag creation control 45 in the tag creation page.

In some embodiments, the aggregation information floating window is displayed prior to the selection controls. In another some embodiments, the selection controls are displayed prior to the aggregation information floating window. In another some embodiments, the selection controls and the aggregation information floating window are simultaneously displayed. The embodiments of this disclosure do not limit a display order.

Step 504*a*: Determine, in response to a received selection operation on a selection control, a target group tag corresponding to the target user account.

Exemplarily, the selection operation is a click operation, and the user determines the target group tag corresponding to the target user account by clicking the selection control. As shown in FIG. 4, when the user clicks the classmate tag, a "tick mark" is displayed on the classmate tag, and it indicates that the group tag is selected. In some cases, the target user account belongs to at least two groups. For example, the user represented by the account 1 is a classmate and is also a friend, and then the user can simultaneously select the classmate tag and the friend tag.

Exemplarily, the terminal can display the aggregation information corresponding to the target user account in the aggregation information floating window, and display the selection controls of the candidate groups in the peripheral region of the aggregation information floating window (that is, selecting the controls). Determine, in response to a group selection operation triggered on a target selection control, the candidate group corresponding to the target selection control to be a group to which the target user account belongs. A selection confirmation control is further displayed in the peripheral region of the aggregation information floating window. The terminal displays, in response to the group selection operation triggered on the target selection control, the target selection control in a selected state, and determines, in response to a selection confirmation operation triggered on the selection confirmation control, the candidate group corresponding to the target selection control to be the target group to which the target user account belongs. That is, the terminal displays the aggregation information corresponding to the target user account in the aggregation information floating window. The user selects the group of the target user account according to the aforementioned aggregation information. The terminal displays, in response to the group selection operation triggered by the user on the selection control corresponding to the target group, the selection control in a selected state. The user can sequentially select one or two or more selection controls. The terminal determines the candidate group corresponding to a selected target selection control to be the target group. After selecting the group, the user clicks the selection confirmation control. The terminal divides, in response to the selection confirmation operation triggered on the selection confirmation control, the target user account into the target group.

Step 505a: Determine, according to the target group tag, the target group to which the target user account belongs.

The IM application program determines the target group according to the selected tag.

Step 502b: Determine, in response to a received sliding operation performed on the aggregation information floating window, a sliding direction of the aggregation information floating window, the sliding direction being associated with a candidate group tag corresponding to the local user account.

Figure 10:
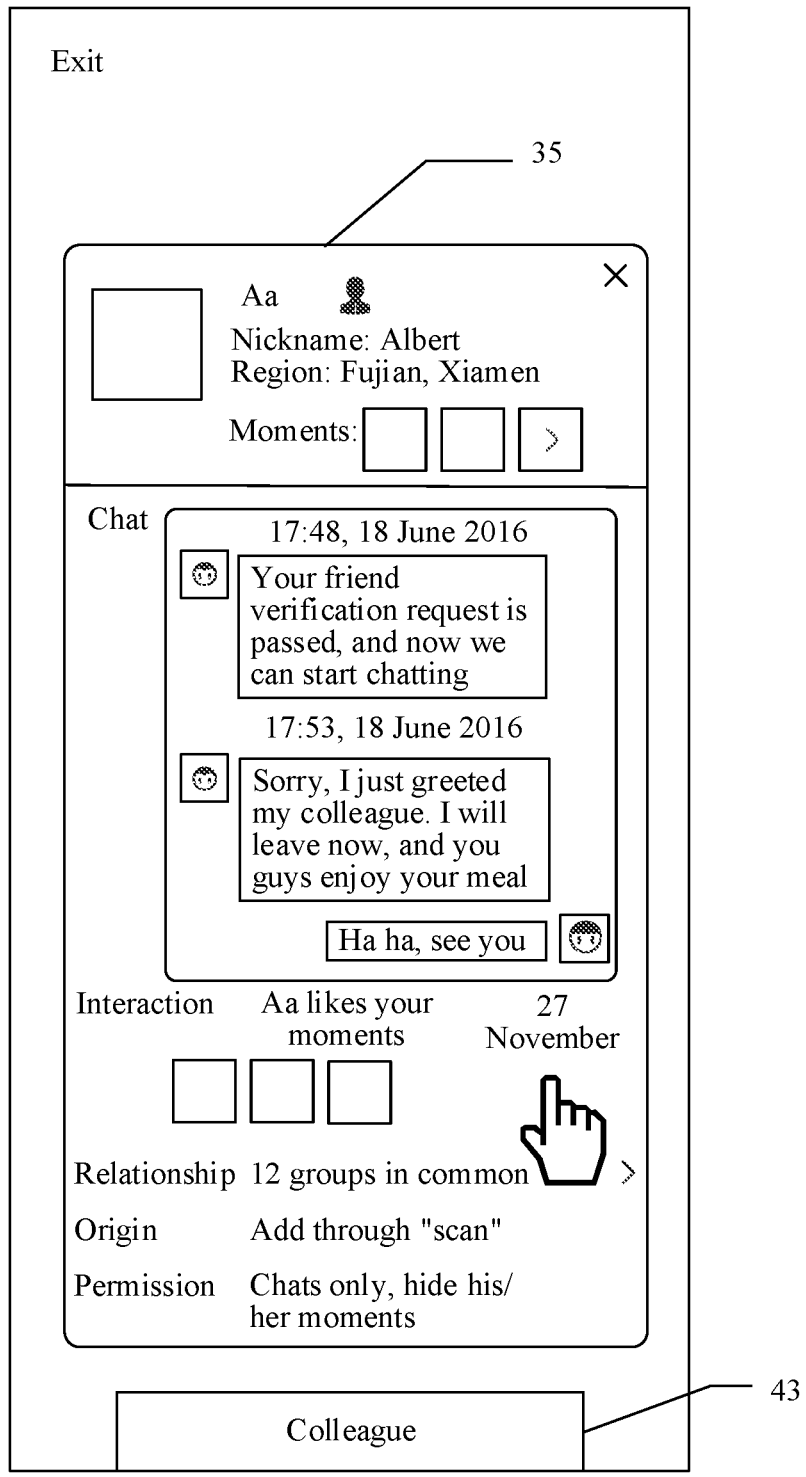
FIG. 10 is a schematic diagram of aggregation information corresponding to a user account according to another exemplary embodiment of this disclosure.

The aggregation information corresponding to the target user account is displayed through the aggregation information floating window. In some embodiments, the user can slide the whole aggregation information floating window. As shown in FIG. 10, when the user downwardly slides the aggregation information floating window, the selection control 43 (a colleague group tag) is displayed below, and the target user account is divided into the colleague group tag. It can be understood that different sliding directions represent different user tags. For example, a group tag corresponding to upward sliding is the classmate group tag, a group tag corresponding to leftward sliding is a relative group tag, and a group tag corresponding to rightward sliding is a friend group tag. The embodiments of this disclosure do not limit the group tag represented by the sliding direction.

Step 503b: Determine a group corresponding to the group tag represented by the sliding direction to be the target group to which the target user account belongs.

The IM application program determines, according to the sliding operation, the target group to which the target user account belongs.

Step 506: Add the target user account to the target group.

Therefore, according to the method of this embodiment, by aggregating at least two dimensions of identity association information corresponding to the user account into the aggregation information, the user can view more comprehensive information (the aggregation information) of the same user account. When the user does not know the user identity represented by the user account, the user does not need to switch to different social functions to view the identity association information of the user account. Therefore, the operation steps when the user performs grouping are simplified, and the grouping efficiency is improved.

According to the method of this embodiment, by displaying different types of controls on the aggregation information, the user determines the identity of the target user account by combining a plurality of types of controls, and does not need to switch to different social functions to view the identity association information corresponding to the target user account. Therefore, the operation steps when the user performs grouping are simplified, and the grouping efficiency is improved.

According to the method of this embodiment, by performing an interaction operation with different types of controls, a corresponding information interface can be switched and displayed, so that the user can determine the identity of the target user account through more detailed information. Even though it is needed to switch to information interfaces corresponding to different social functions, it is also convenient for the operation of the user.

According to the method of this embodiment, by displaying the selection controls in the peripheral region of the aggregation information floating window, the user is guided to determine, in a mode of selecting the group tag control, the target group to which the target user account belongs. When the user determines the identity of the target user account, the grouping operation can be triggered in an interface where the aggregation information floating window is located. Therefore, the human-computer interaction efficiency is improved, and for the user experience, the operation is simper when the user performs grouping on the target user account.

According to the method of this embodiment, by performing a gesture operation (a sliding operation) on the aggregation information floating window, the group corresponding to the target user account is determined, and the user does not need to perform a click operation multiple times. Therefore, the operation steps of the user are simplified, and the grouping efficiency is improved.

It can be understood that the aforementioned embodiments can be respectively and individually implemented, and can also be implemented in any combination.

Figure 11:
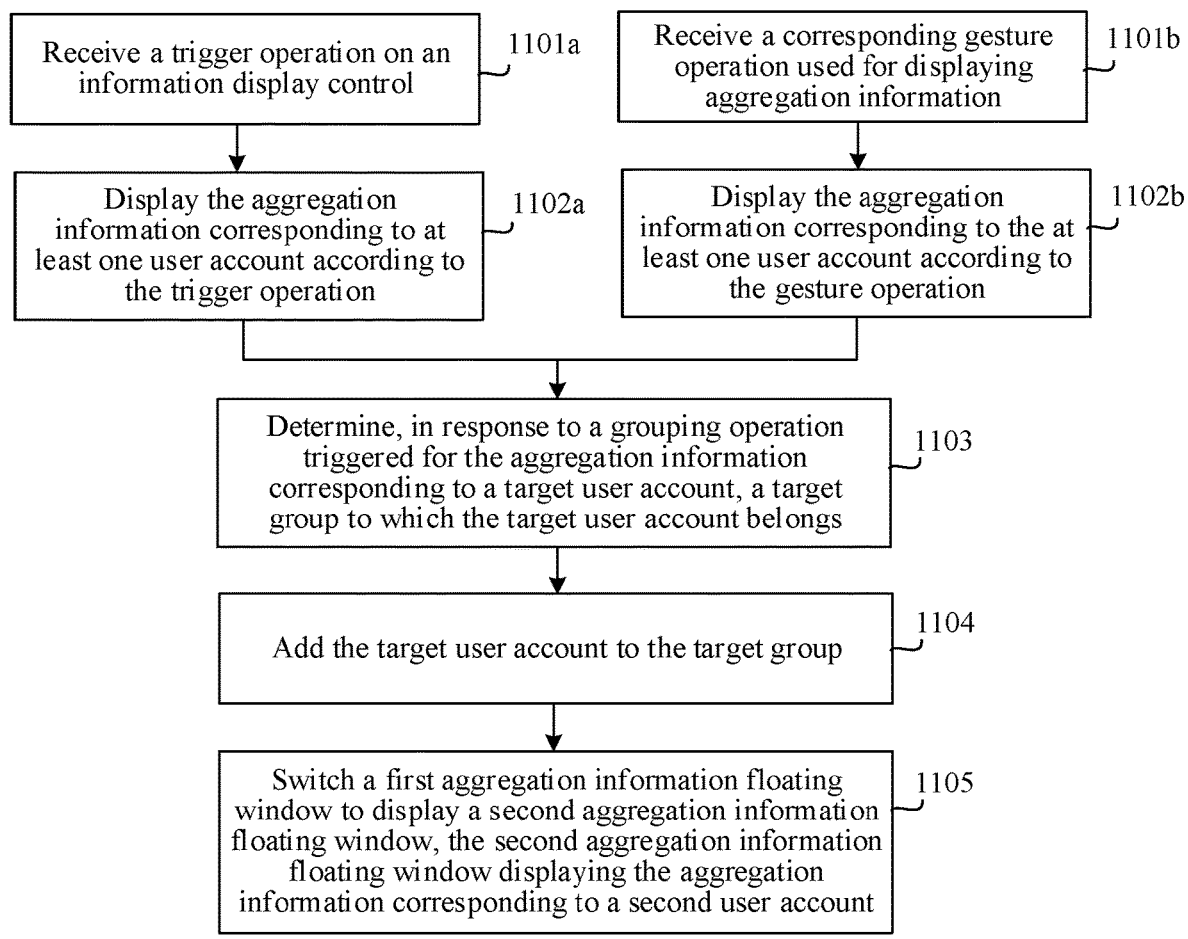
FIG. 11 is a flowchart of an object account grouping method according to another exemplary embodiment of this disclosure.

In an exemplary embodiment based on FIG. 5, when there are a plurality of target user accounts, exemplarily, the number of user accounts is n, a target user account is a first user account in the n user accounts, and n is a positive integer. The display mode of the aggregation information corresponding to the n user accounts includes the following steps. As shown in FIG. 11.

Step 1101a: Receive a trigger operation on an information display control.

By using the IM application program as an example, the local user account is a user account logged into the IM application program, and the target user account has a friend relationship with the local user account. As shown in the upper left drawing of FIG. 12, the information display control 51 is displayed in an address book page 50 of the IM application program. The information display control 51 is configured to display the aggregation information floating window of the target user account. Exemplarily, the trigger operation includes at least one of the click operation, the double click operation, the long-press operation, the sliding operation, the dragging operation, and the combination operation thereof.

Figure 12:
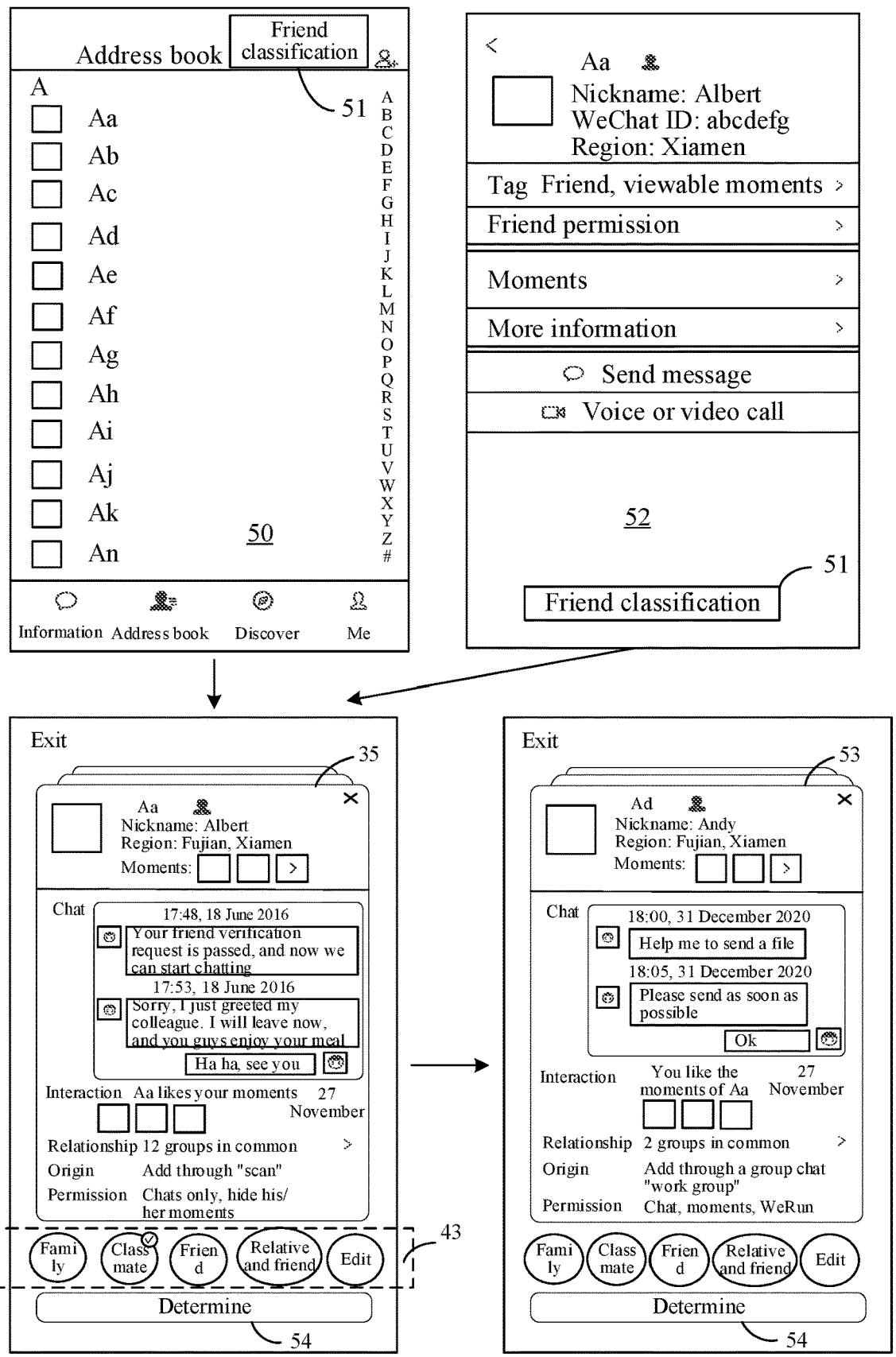
FIG. 12 is a schematic diagram of a grouping interface of a user account according to one exemplary embodiment of this disclosure.

In some embodiments, as shown in the upper right drawing of FIG. 12, the information display control 51 can further be displayed on a profile page 52 of each user account. The profile page 52 is configured to display the identity information of the target user account, such as the avatar of the target user account, the nickname, the account, the region, and other basic information.

Step 1102a: Display the aggregation information corresponding to at least one user account according to the trigger operation.

The number of the user accounts is n and n is a positive integer. The terminal displays n aggregation information floating windows corresponding to the n user accounts, and the aggregation information floating window of the same user account includes at least one of the identity information control and the interaction information control corresponding to the user account. The terminal can superimpose and display the n aggregation information floating windows. Exemplarily, the user clicks the information display control 51, and the address book page 50 is switched to display a picture corresponding to the lower left drawing of FIG. 12. The n aggregation information floating windows 35 corresponding to the n user accounts are superimposed and displayed on the address book page 50.

When the user clicks the information display control 51, the profile page 52 is switched to display the picture corresponding to the lower left drawing of FIG. 12. The n aggregation information floating windows 35 corresponding to the n user accounts are superimposed and displayed on the profile page 52.

Step 1101b: Receive a corresponding gesture operation used for displaying the aggregation information.

Step 1102b: Display the aggregation information corresponding to at least one user account according to the gesture operation.

In some embodiments, the user can display the n aggregation information floating windows 35 corresponding to the n user accounts through the gesture operation when the terminal is in a screen locked state. In another some embodiments, the user can implement the gesture operation on any interface of the IM application program to display the n aggregation information floating windows 35 corresponding to the n user accounts.

As shown in the lower left drawing of FIG. 12, the IM application program displays the n aggregation information floating windows 35 corresponding to the n user accounts, and the aggregation information floating window 35 of the same user account includes at least one of the identity information control and the interaction information control corresponding to the user account.

The n aggregation information floating windows include k layers of aggregation information floating windows that are superimposed and displayed, each layer of the aggregation information floating windows include m aggregation information floating windows that are tiled and displayed, k*m≤n, and k and m are positive integers. Exemplarily, n is 30, and then 30 aggregation information floating windows are arranged in a mode shown in FIG. 12; and m is 1, and then k is 30, that is, the aggregation information floating windows are arranged in 30 layers. In another some embodiments, the 30 aggregation information floating windows are displayed in the mode that there are 6 aggregation information floating windows in each layer and the aggregation information floating windows are arranged in 5 layers. Each layer of 6 aggregation information floating windows are arranged in two rows, and there are 3 aggregation information floating windows in each row.

The display modes and display contents of the identity information control and the interaction information control are as shown in the aforementioned embodiments herein.

Step 1103: Determine, in response to the grouping operation triggered for the aggregation information corresponding to the target user account, the target group to which the target user account belongs.

Exemplarily, the selection control 43 is displayed below the aggregation information floating window 35. After the user clicks the selection control 43, a "tick mark" corresponds to the selected selection control, for example, the user account Aa is divided into the classmate group.

Step 1104: Add the target user account to the target group.

Step 1105: Switch a first aggregation information floating window to display a second aggregation information floating window, the second aggregation information floating window displaying the aggregation information corresponding to the second user account.

The user accounts include at least two user accounts. The terminal displays the aggregation information controls (that is, the aggregation information floating windows) corresponding to other user accounts after adding the target user account to the target group, and the other user accounts refer to user accounts in the at least two user accounts other than the target user account.

In some embodiments, as shown in the lower left drawing of FIG. 12, a confirmation control 54 is displayed below the selection control 43, and after clicking the confirmation control 54, the user divides the target user account into the target group. Exemplarily, the user accounts of the target group include the first user account. After the first user account is divided into the target group, the first aggregation information floating window 35 corresponding to the first user account is switched to display the second aggregation information floating window 53, and the second aggregation information floating window 53 displays the aggregation information corresponding to the second user account (Ad), as shown in the lower right drawing of FIG. 12.

Exemplarily, the terminal displays the aggregation information floating window of the target user account. The aggregation information floating windows corresponding to the other user accounts are displayed in response to a floating window switching operation triggered on the aggregation information floating window. That is, when the user skips grouping on the target user account, the user can directly switch to next user account to perform grouping on the next user account.

It can be understood that the user can switch, by clicking an off control (that is, an "X" mark) at the upper right corner of the aggregation information floating window 35, the first aggregation information floating window 35 to display the second aggregation information floating window 53. The user can further exit the grouping process of the user accounts by clicking an exit control at the upper left corner of the page, that is, turning off the aggregation information floating windows corresponding to all the user accounts.

In conclusion, according to the method of this embodiment, by displaying the aggregation information corresponding to the user accounts in the form of an aggregation floating window, the user accounts can be quickly switched between the aggregation information corresponding to a plurality of user accounts, so that it is convenient for grouping the user accounts by the user, and the grouping efficiency is improved.

It can be understood that the aforementioned embodiments can be respectively and individually implemented, and can also be implemented in any combination.

Figure 13:
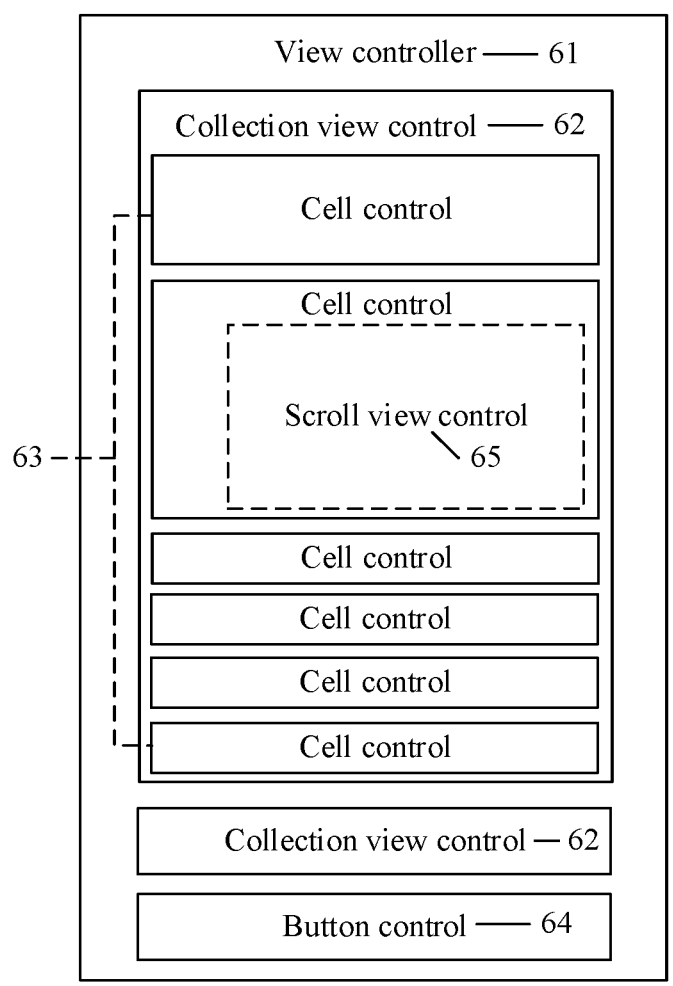
FIG. 13 is a framework diagram of the configuration of a control according to one exemplary embodiment of this disclosure.

FIG. 13 is a schematic framework diagram of a user interface control according to one exemplary embodiment of this disclosure. The framework diagram is a framework used for representing a user interface displayed when the user performs grouping. The embodiment of this disclosure uses an iOS client as an example, and the user interface is displayed through a UI view controller 61 in combination with a plurality of controls.

The UI view controller 61 includes a longitudinal UI collection view control 62. The aggregation information corresponding to the user account is displayed through the UI collection view control 62. The identity information control and the interaction information control are displayed through UI collection view cells 63. A transverse side sliding UI collection view control is further added to the UI collection view control 62. The transverse side sliding UI collection view control is configured to switch the aggregation information floating window corresponding to one user account to display the aggregation information floating window corresponding to another user account after the user performs grouping on the user accounts.

For the display mode of the single-user chat session record between the target user account and the local user account, the single-user chat session record is displayed through a UI scroll view control 65. When the UI scroll view control 65 receives the sliding operation of the user, the single-user chat session record between the target user account and the local user account can be loaded. For the display mode of the group chat session record of the target user account and the local user account in the same group chat, the chat session record associated with the target user account and the local user account is displayed through the UI scroll view control 65. That is, for the group chat session record in which the target user account mentions the local user account, or the local user account mentions the target user account, or the local user account and the target user account are simultaneously mentioned by another user account in a group, when the UI scroll view control 65 receives the sliding operation of the user, the chat session record associated with the target user account and the local user account can be loaded.

Another UI collection view control 62 is configured above a UI button control 64. The UI collection view control 62 is configured to display the selection control corresponding to the local user account, or the selection control preset by the client. When the user clicks the selection control, the user determines a group corresponding to the selection control to be the target group to which the target user account belongs.

The UI button control 64 is configured to confirm to divide the target user account into the target group. Exemplarily, the user can select at least one group tag for the same user account, and after selecting the group tag, click the UI button control 64 to divide the user account into the corresponding target group.

Figure 14:
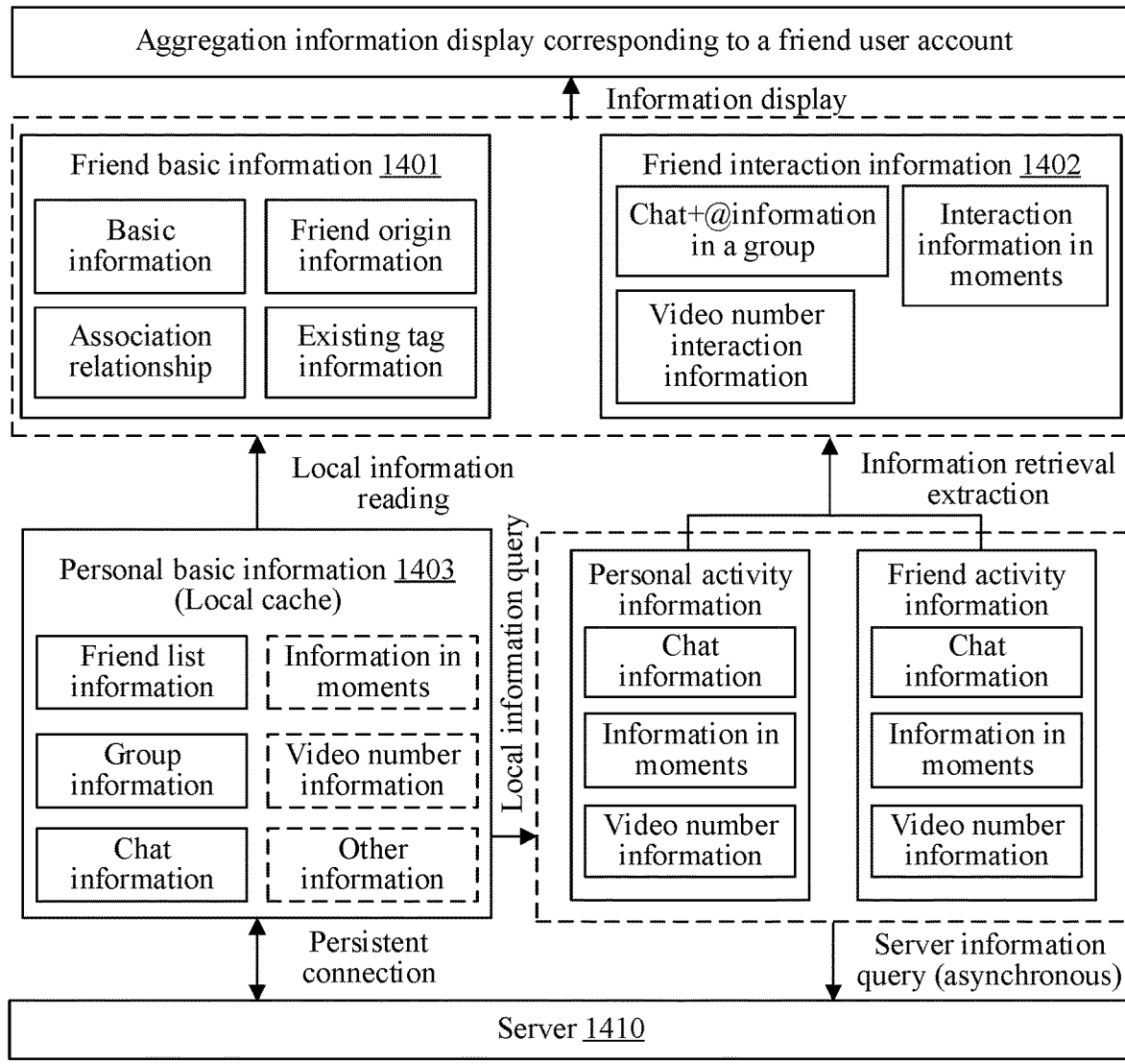
FIG. 14 is a framework diagram of the composition and origin of aggregation information according to one exemplary embodiment of this disclosure.

FIG. 14 is a framework diagram of aggregation information display according to one exemplary embodiment of this disclosure.

By using the IM application program as an example, a large number of friend user accounts correspond to the local user account logged into the IM application program, and the amount of information such as the chat record is large. The information compositions and information origins of the aggregation information corresponding to the friend user accounts are respectively described below.

1. Information Composition.

The aggregation information corresponding to the friend user accounts mainly includes the following two dimensions of information.

Friend basic information 1401: mainly being some static information of a friend, including the basic information of the friend, the friending mode, the association relationship (the common group chat), the remark, and existing tag information.

Friend interaction information 1402: mainly being activity interaction information directly generated with the friend, including a direct chat record, mutual reminding information (that is, the information of mutual mention) between the users in an association group, mutual like, comment, or reply information made on information in the mutual social circles (such as the moments), and mutual like, comment, or reply information made on mutual video information.

2. Information Origin.

Friend basic information: The IM application program and the server 1410 keep persistent connection communication. When the local user account is an online state, the identity information corresponding to the target user account is synchronized to a client through the persistent connection. When the local user account is in an offline state, the user performs cold boot on the IM application program. The terminal performs query through the server 1410 corresponding to the IM application program, and updates the identity information of a local existing target user account. Therefore, the friend basic information can be completely extracted from the basic information of the local cache in the terminal, and it is not needed to communicate with the server 1410 corresponding to the IM application program.

Friend activity information-chat+mention information in a group: because the persistent connection communication, the chat, and the group messages generally can also be directly read from the local cache, but occasionally, there are the cases that the user deletes and clears the chat record, and the user can replace the terminal, or the account is logged into a plurality of terminals, in this case, if the chat record of 1V1 cannot be found from the local cache, asynchronous query is performed again in the server 1410, and thus, it is ensured that the chat record of 1V1 can really feed back the communication history of the user and the current friend. Moreover, due to the uncertainty of group history messages of a common group with the friend, it is considered that the amount of data to be queried is large, and if there locally no relevant information of group mention, server information query is not performed again.

Friend activity information—interaction information in the social circle: because the social circle relates to moment characteristics, such as a permission (viewable for last 3 days or 6 months, moment deletion, comment reply and update, etc.), the social circle generally only caches information that is last viewed, and when the social circle is viewed every time, an asynchronous request is performed for updating. Therefore, the asynchronous request is performed on a background unless the interaction information in the social circle is locally found.

Friend activity information—video interaction information: the video interaction information is basically identical to the interaction information in the social circle. The asynchronous request is performed again on the background unless the video interaction information is locally found.

After the relevant results of the aforementioned information are found, the results are aggregated to generate the aggregation information, and the aggregation information is also locally cached, so that a direct display data source is provided for the next grouping of the friend user account.

Figure 15:
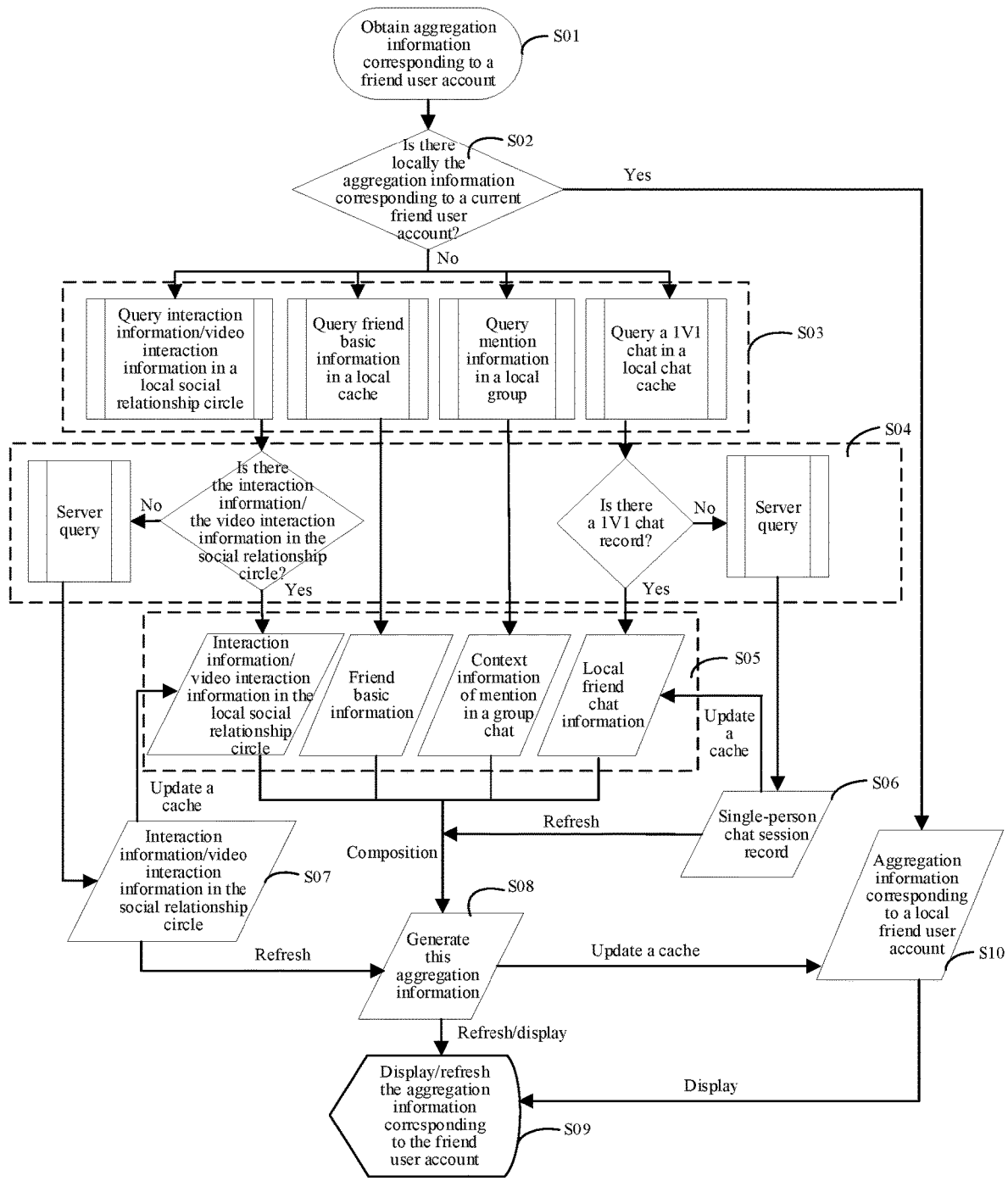
FIG. 15 is a flowchart of the configuration of aggregation information according to one exemplary embodiment of this disclosure.

FIG. 15 is a flowchart of the configuration of aggregation information according to one exemplary embodiment of this disclosure. The configuration of the aggregation information corresponding to the friend user account mainly includes the following parts.

Step S01: obtain the aggregation information corresponding to the friend user account.

When the user clicks an information display button, enter an aggregation information acquisition process, and start from a first friend user account of the user to construct the aggregation information corresponding to all the friend user accounts.

Step S02: is there locally the aggregation information corresponding to a current friend user account?

Query, from the local cache of the terminal, whether the aggregation information corresponding to the friend user account has previously been constructed. If the aggregation information corresponding to the friend user account is constructed, directly display the aggregation information, and enter step S10. If the aggregation information corresponding to the friend user account is not constructed, enter step S03.

Step S03: Simultaneously query, from the local cache, the friend basic information, 1V1 chat information, the association group chat information (mention information in the local group), and the interaction information and the video interaction information between the friend user account and the logged user account in the social circle.

Step S04: Is there the interaction information/the video interaction information in the social circle?

If it is locally queried that the interaction information/the video interaction information in the social circle is empty, asynchronously query, in the server, the interaction information or the video interaction information in the social circle. After a query result is returned, refresh the aggregation information corresponding to the friend user account. Simultaneously update the interaction information or the video interaction information in the social circle in the local cache. If it is locally queried that the interaction information or the video interaction information in the social circle is not empty, enter step S05.

Similarly, when there is a 1V1 friend chat record in the local cache, directly construct the aggregation information for display. Otherwise, asynchronously query in the server. After a query result is returned, refresh the aggregation information. Simultaneously update local friend chat information (the single-user chat session record). If it is locally queried that the 1V1 friend chat record is not empty, enter step S05.

Step S05: If it is locally queried that the interaction information or the video interaction information in the social circle is not empty, directly constitute this aggregation information together with the friend basic information, the friend chat information, and the context information of mention in the group chat that are locally queried, and perform information display (if the aggregation information exists in step S02, refresh the information).

Step S06: Obtain the single-user chat session record from the server.

Update the local friend chat information (the 1V1 friend chat record) after the single-user chat session record is obtained.

Step S07: Obtain the interaction information/the video interaction information in the social circle from the server.

Update the interaction information and the video interaction information in social circle in the local cache after the interaction information/the video interaction information in the social circle is obtained.

Step S08: Generate this aggregation information.

The aggregation information corresponding to this friend user account is generated according to the aggregation information that is obtained in the aforementioned steps and corresponds to the friend user account.

Step S09: Display/refresh the aggregation information corresponding to the friend user account.

The aggregation information corresponding to the friend user account in the local cache is also updated after the aggregation information corresponding to this friend user account is generated.

Step S10: Obtain the aggregation information corresponding to a local friend user account.

If there is the aggregation information corresponding to the friend user account in the local cache, enter step S09.

On the basis of the aforementioned process, when the user starts the grouping process of the friend user account, the user may preferentially read local cache information for combined display, and then on the basis of a result during reading, asynchronously queries a required information refresh interface, so that a requirement for rapidly generating the aggregation information corresponding to the friend user account for the user can be satisfied.

Exemplarily, the object account grouping method provided by the embodiments of this disclosure can further be applied to the address book. The smart phone used by the user displays an address book page, and a group control is displayed in the address book page. When the user clicks the group control, the aggregation information floating window corresponding to each contact in the address book is displayed. The selection controls are displayed in the peripheral region of the aggregation information floating window. The aggregation information floating window displays at least two of the name of the contact, a mobile phone number, a home phone number, an office phone number, an E-mail address, short message content between the user and the contact, a call record between the user and the contact, and the real picture of the contact. The short message content between the user and the contact is obtained by an address book application program calling a short message application program according to the telephone number of the contact. The call record between the user and the contact is obtained by the address book application program calling a dialing application program according to the telephone number of the contact.

The user clicks the selection control according to the aggregation information floating window corresponding to a target contact, and divides the target contact into a corresponding target group.

In some embodiments, the aggregation information floating window corresponding to the target contact further displays the identity association information of the target contact in other application programs. For example, the aggregation information floating window displays the identity association information of the target contact in the IM application program 1. In this case, the target contact registers the user account corresponding to the IM application program 1 at the mobile phone number of the target contact. Therefore, the address book application program can determine the identity association information of the target contact in the IM application program 1 through the mobile phone number.

The information (including, but not limited to, user equipment information, user personal information, etc.), the data (including, but not limited to, data for analysis, stored data, displayed data, etc.), and the signal involved in this application all are authorized by the user or fully authorized by each party, and the collection, use, and processing of relevant data need to comply with relevant laws and regulations of relevant countries and regions. For example, the identity association information involved in this application is obtained under full authorization.

Exemplarily, in the embodiment of this disclosure, the identity association information of the user account is obtained in the case that the holder of the user account performs authorization. The authorization process of the holder is as follows.

The terminal displays, in response to a viewing operation for the aggregation information corresponding to at least one user account, an authorization interface, and determines, in response to an authorization operation on the authorization interface, to authorize a viewing permission to other user accounts for the aggregation information corresponding to the local user account. The other user accounts include the friend user account and/or an unknown account.

For example, the terminal pops up a pop-up window on the user interface in response to the viewing operation for the aggregation information corresponding to the at least one user account, and displays the aforementioned authorization interface in the pop-up window. That is, when a grouping function is used, first, it is determined whether the viewing permission for the aggregation information of the user account is authorized. Exemplarily, for each social function, the terminal displays the authorization interface to respectively perform an authorization operation for each social function.

The following is an apparatus embodiment of this disclosure, which can be used to perform the method embodiments of this disclosure. For details not disclosed in the apparatus embodiments of this disclosure, refer to the method embodiments of this disclosure.

Figure 16:
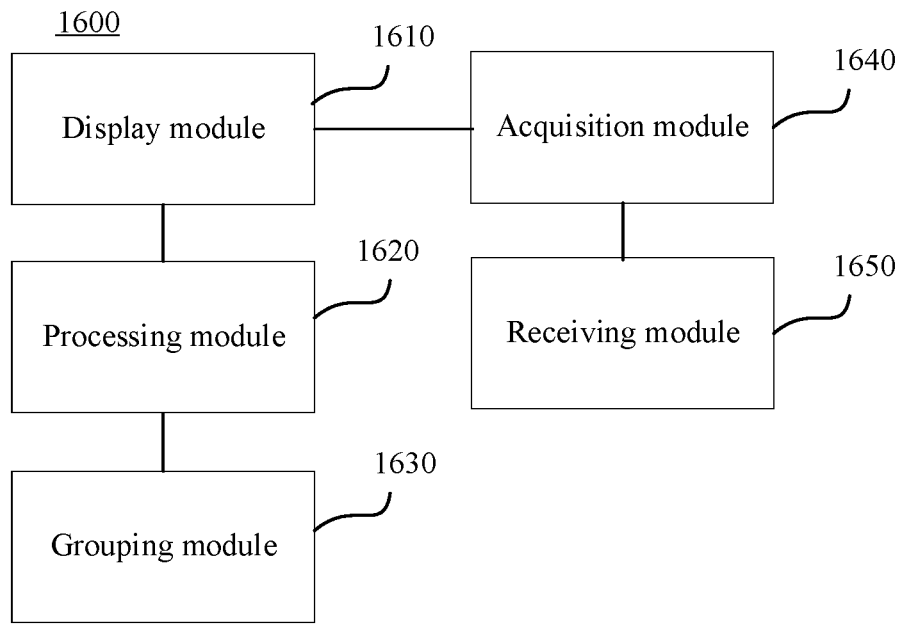
FIG. 16 is a block diagram of an object account grouping apparatus according to one exemplary embodiment of this disclosure.

FIG. 16 is a block diagram of an object account grouping apparatus 1600 according to one exemplary embodiment of this disclosure. The apparatus 1600 includes the following parts:

a display module 1610, configured to display aggregation information corresponding to at least one user account, the aggregation information including at least two dimensions of identity association information, and the identity association information being used for identifying identity information associated with the user account;

a processing module 1620, configured to determine, in response to a grouping operation triggered for the aggregation information corresponding to a target user account in the at least one user account, a target group to which the target user account belongs; and a grouping module 1630, configured to add the target user account to the target group.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In one exemplary embodiment, the at least two dimensions of identity association information include: the identity association information in different social functions in a same application program or different application programs.

In one exemplary embodiment, the identity association information in the different social functions includes at least two dimensions of the following information: identity information of the user account; a single-user chat session record corresponding to the user account and a local user account; a group chat session record associated with the user account; interaction information between the user account and the local user account in a social circle; video interaction information associated with the user account, the video interaction information being information generated after a video interaction operation, and the video interaction operation including at least one of a comment operation, a like operation, a forwarding operation, and a favorite operation; live broadcast interaction information associated with the user account; and a transaction record between the user account and the local user account.

In one exemplary embodiment, the display module 1610 is configured to display an aggregation information control corresponding to the target user account, the aggregation information control including at least one of an identity information control and an interaction information control corresponding to the target user account.

In one exemplary embodiment, the interaction information control includes a chat record control.

The display module 1610 is configured to update and display, in response to a received sliding operation on the chat record control, the single-user chat session record corresponding to the target user account and the local user account.

In one exemplary embodiment, the interaction information control includes a chat record control.

The display module 1610 is configured to switch, in response to a received switching operation on the chat record control, an aggregation information floating window corresponding to the target user account to display a chat session interface corresponding to the target user account and the local user account.

In one exemplary embodiment, the interaction information control includes a group chat record control.

The display module 1610 is configured to update and display, in response to a received sliding operation on the group chat record control, a group chat session record associated with the target user account and the local user account.

In one exemplary embodiment, the interaction information control includes a group chat record control.

The display module 1610 is configured to switch, in response to a received switching operation on the group chat record control, the aggregation information floating window corresponding to the target user account to display a group chat session interface corresponding to the target user account and the local user account.

In one exemplary embodiment, the interaction information control includes an association information interaction control.

The display module 1610 is configured to switch, in response to a received switching operation on the association information interaction control, the aggregation information floating window to display a message list corresponding to association interaction information, the message list including the association interaction information of the target user account and the local user account in the social circle, and the association interaction information including at least one of reminding information, like information, comment information, and reply information.

In one exemplary embodiment, the display module 1610 is configured to display the aggregation information corresponding to the target user account in the aggregation information floating window; and display selection controls for candidate groups in a peripheral region of the aggregation information floating window.

The processing module 1620 is configured to determine, in response to a group selection operation triggered on a target selection control, a candidate group corresponding to the target selection control to be the target group to which the target user account belongs.

In one exemplary embodiment, a selection confirmation control is further displayed in the peripheral region of the aggregation information floating window.

The processing module 1620 is configured to display, in response to the group selection operation triggered on the target selection control, the target selection control in a selected state, and determine, in response to a selection confirmation operation triggered on the selection confirmation control, the candidate group corresponding to the target selection control to be the target group to which the target User account belongs.

In one exemplary embodiment, the apparatus includes an acquisition module 1640, and the aggregation information corresponding to the target user account is displayed through the aggregation information floating window.

The acquisition module 1640 is configured to acquire a candidate group tag corresponding to the local user account.

The display module 1610 is configured to display selection controls corresponding to candidate group tags in the peripheral region of the aggregation information floating window.

The processing module 1620 is configured to determine, in response to a received selection operation on a selection control, a target group tag corresponding to the target user account, and determine, according to the target group tag, the target group to which the target user account belongs.

In one exemplary embodiment, the display module 1610 is configured to display the aggregation information corresponding to the target user account in the aggregation information floating window.

The processing module 1620 is configured to determine, in response to a received sliding operation performed on the aggregation information floating window, a sliding direction of the aggregation information floating window, the sliding direction being associated with a candidate group tag corresponding to the local user account, and determine a group corresponding to the group tag represented by the sliding direction to be the target group to which the target user account belongs.

In one exemplary embodiment, the number of the user accounts is n and n is a positive integer.

The display module 1610 is configured to display n aggregation information floating windows corresponding to n user accounts, and the aggregation information floating window of a same user account includes at least one of the identity information control and the interaction information control corresponding to the user account.

In one exemplary embodiment, the n aggregation information floating windows include k layers of aggregation information floating windows that are superimposed and displayed, each layer of the aggregation information floating windows include m aggregation information floating windows that are tiled and displayed, k*m≤n, and k and m are positive integers.

In one exemplary embodiment, the aggregation information corresponding to the user account is arranged and displayed through the n aggregation information floating windows. The target user account includes a first user account, and the aggregation information corresponding to the first user account is displayed in a first aggregation information floating window.

The display module 1610 is configured to switch the first aggregation information floating window to display a second aggregation information floating window, the second aggregation information floating window displaying the aggregation information corresponding to a second user account.

In an exemplary embodiment, the user accounts include at least two user accounts.

The display module 1610 is configured to display aggregation information controls corresponding to other user accounts after the target user account is added to the target group, the other user accounts referring to user accounts in the at least two user accounts other than the target user account.

In one exemplary embodiment, the apparatus includes a receiving module 1650.

The receiving module 1650 is configured to receive a trigger operation on the information display control. The display module 1610 is configured to display the aggregation information corresponding to the at least one user account according to the trigger operation. Alternatively, the receiving module 1650 is configured to receive a corresponding gesture operation used for displaying the aggregation information. The display module 1610 is configured to display the aggregation information corresponding to the at least one user account according to the gesture operation.

Figure 17:
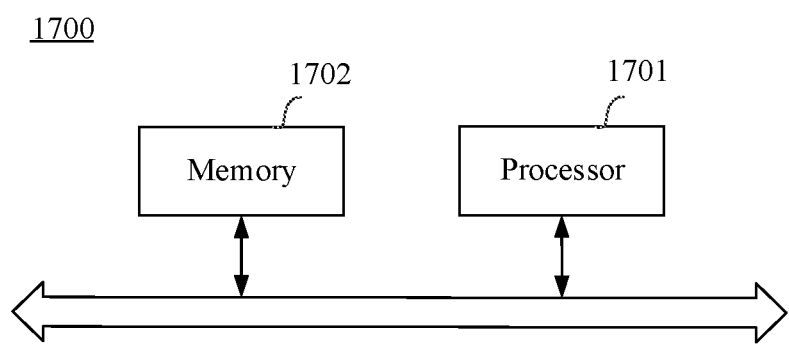
FIG. 17 is a block diagram of a computer device according to one exemplary embodiment of this disclosure.

FIG. 17 is a structural block diagram of a computer device 1700 according to one exemplary embodiment of this disclosure. The computer device 1700 can be a portable mobile terminal, such as a smart phone, a tablet computer, a Moving Picture Experts Group Audio Layer III (MP3) player, and a Moving Picture Experts Group Audio Layer IV (MP4) player. The computer device 1700 may be further referred to as another name such as user equipment or a portable terminal.

The computer device 1700 generally includes: a processor 1701 and a memory 1702.

The processor 1701 may include one or more processing cores, such as a 4-core processor or an 8-core processor. The processor 1701 may be implemented by using at least one hardware form of a digital signal processor (DSP), a field-programmable gate array (FPGA), and a programmable logic array (PLA). The processor 1701 may alternatively include a main processor and a coprocessor. The main processor is configured to process data in an active state, also referred to as a CPU. The coprocessor is a low-power consumption processor configured to process data in a standby state. In some embodiments, the processor 1701 may be integrated with a graphics processing unit (GPU). The GPU is configured to be responsible for rendering and drawing content that a display needs to display. In some embodiments, the processor 1701 may further include an artificial intelligence (AI) processor. The AI processor is configured to process a computing operation related to machine learning.

The memory 1702 may include one or more computer-readable storage media. The computer-readable storage medium may be tangible and non-transient. The memory 1702 may further include a high-speed random access memory, as well as non-transitory memory, such as one or more disk storage devices and flash storage devices. In some embodiments, the non-transitory computer-readable storage medium in the memory 1702 is configured to store at least one instruction, and the at least one instruction being configured to be executed by the processor 1701 to implement the object account grouping method provided in the embodiments of this disclosure.

A person skilled in the art may understand that the structure shown in FIG. 17 does not constitute any limitation on the computer device 1700, and the computer device may include more components or fewer components than those shown in the figure, or some components may be combined, or a different component deployment may be used.

An embodiment of this disclosure further provides a computer device. The computer device includes: a processor and a memory, the memory of the computer device storing at least one instruction, at least one program, a code set, or an instruction set, the at least one instruction, the at least one program, the code set, or the instruction set being loaded and executed by the processor to implement the object account grouping method in the foregoing embodiments.

An embodiment of this disclosure further provides a computer-readable storage medium, storing a computer program, the computer program, when executed by a processor, implementing the object account grouping method in the foregoing embodiments.

An embodiment of this disclosure further provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to implement the object account grouping method according to the foregoing embodiments.

What is claimed is:

1. An object account grouping method, applied to a computing device, the method comprising:
   obtaining, with a processor circuitry, at least two dimensions of identity association information for at least one object account, the identity association information being for identifying identity information associated with the object account, and the at least two dimensions of identity association information being configured to be displayed in different user interfaces of a computing device respectively;
   aggregating, with the processor circuitry, the at least two dimensions of identity association information to obtain aggregation information;
   displaying, with a processor circuitry, the aggregation information in a single aggregation information floating window via a user interface of the computing device;
   detecting, with the processor circuitry, a grouping operation performed on the aggregation information floating window via the user interface of the computing device, the grouping operation being for the aggregation information corresponding to a target object account in the at least one object account;
   displaying, with the processor circuitry, selection controls for candidate groups in a peripheral region of the aggregation information floating window based on the grouping operation;
   detecting, with the processor circuitry, a group selection operation triggered on a target selection control via the user interface of the computing device;
   in response to the group selection operation, determining, with the processor circuitry, a candidate group corresponding to the target selection control to be the target group to which the target object account belongs; and
   displaying, with the processor circuitry, the target group including the target object account via the user interface.

2. The method according to claim 1, wherein the at least two dimensions of identity association information comprises identity association information in different social functions of a same application program or identity association information in different social functions of different application programs.

3. The method according to claim 2, wherein the identity association information in the different social functions comprises at least two of followings:
   identity information of the object account;
   a single-user chat session record corresponding to the object account and a local object account;
   a group chat session record associated with the object account;
   interaction information between the object account and the local object account in a social circle;
   video interaction information associated with the object account, the video interaction information being information generated after a video interaction operation, and the video interaction operation comprising at least one of a comment operation, a like operation, a forwarding operation, or a favorite operation;
   live broadcast interaction information associated with the object account; or
   a transaction record between the object account and the local object account.

4. The method according to claim 1, wherein the displaying the aggregation information corresponding to the at least one object account comprises:
   displaying an aggregation information control corresponding to the target object account, the aggregation information control comprising an identity information control or an interaction information control corresponding to the target object account.

5. The method according to claim 4, wherein the interaction information control comprises a chat record control, and the method further comprises:
   updating and displaying, in response to receiving a sliding operation on the chat record control, a single-user chat session record corresponding to the target object account and a local object account.

6. The method according to claim 4, wherein the interaction information control comprises a chat record control, and the method further comprises:
   switching, in response to receiving a switching operation on the chat record control, an aggregation information floating window corresponding to the target object account to display a chat session interface corresponding to target object account and a local object account.

7. The method according to claim 4, wherein the interaction information control comprises a group chat record control, and the method further comprises:
   updating and displaying, in response to receiving a sliding operation on the group chat record control, a group chat session record associated with the target object account and a local object account.

8. The method according to claim 4, wherein the interaction information control comprises a group chat record control, and the method further comprises:
   switching, in response to receiving a switching operation on the group chat record control, an aggregation information floating window corresponding to the target object account to display a group chat session interface corresponding to the target object account and a local object account.

9. The method according to claim 4, wherein the interaction information control comprises an association information interaction control, and the method further comprises:
   switching, in response to receiving a switching operation on the association information interaction control, an aggregation information floating window to display a message list corresponding to association interaction information, the message list comprising association interaction information of the target object account and a local object account in a social circle, and the association interaction information comprising at least one of reminding information, like information, comment information, or reply information.

10. The method according to claim 4, wherein a number of the object accounts is n and n is a positive integer, and the displaying an aggregation information control corresponding to the target object account comprises:
    displaying n aggregation information floating windows corresponding to n object accounts, the aggregation information floating window of a same object account comprising the identity information control or the interaction information control corresponding to the object account.

11. The method according to claim 4, wherein the object accounts comprise at least two object accounts, the method further comprises:
    displaying the aggregation information controls corresponding to other object accounts, the other object accounts referring to object accounts in the at least two object accounts other than the target object account.

12. The method according to claim 1, wherein a selection confirmation control is further displayed in the peripheral region of the aggregation information floating window, and the determining, in response to a group selection operation triggered on a target selection control the candidate group corresponding to the target selection control to be the target group to which the target object account belongs comprises:
    displaying, in response to the group selection operation triggered on the target selection control, the target selection control in a selected state; and
    determining, in response to a selection confirmation operation triggered on the selection confirmation control, the candidate group corresponding to the target selection control to be the target group to which the target object account belongs.

13. The method according to claim 1, wherein the determining the target group to which the target object account belongs comprises:
    determining, in response to receiving a sliding operation performed on the aggregation information floating window, a sliding direction of the aggregation information floating window, the sliding direction being associated with a candidate group tag corresponding to a local object account, and
    determining a group corresponding to a group tag represented by the sliding direction to be the target group to which the target object account belongs.

14. An object account grouping apparatus, the apparatus comprising:
    a memory operable to store computer-readable instructions; and
    a processor circuitry operable to read the computer-readable instructions, the processor circuitry when executing the computer-readable instructions is configured to:
       obtain at least two dimensions of identity association information for at least one object account, the identity association information being for identifying identity information associated with the object account, and the at least two dimensions of identity association information being configured to be displayed in different user interfaces respectively;
       aggregate the at least two dimensions of identity association information to obtain aggregation information;
       display the aggregation information in a single aggregation information floating window via a user interface;
       detect a grouping operation performed on the aggregation information floating window via the user interface, the grouping operation being for the aggregation information corresponding to a target object account in the at least one object account;
       display selection controls for candidate groups in a peripheral region of the aggregation information floating window based on the grouping operation;
       detect a group selection operation triggered on a target selection control via the user interface;
       in response to the group selection operation, determine a candidate group corresponding to the target selection control to be the target group to which the target object account belongs; and
       display the target group including the target object account via the user interface.

15. The apparatus according to claim 14, wherein the at least two dimensions of identity association information comprises identity association information in different social functions of a same application program or identity association information in different social functions of different application programs.

16. The apparatus according to claim 14, wherein the processor circuitry is configured to:
    display an aggregation information control corresponding to the target object account, the aggregation information control comprising an identity information control or an interaction information control corresponding to the target object account.

17. The apparatus according to claim 14, wherein the processor circuitry is configured to:

display the aggregation information corresponding to the target object account in an aggregation information floating window;

display selection controls for candidate groups in a peripheral region of the aggregation information floating window;

determine, in response to a group selection operation triggered on a target selection control, a candidate group corresponding to the target selection control to be the target group to which the target object account belongs.

18. The apparatus according to claim 14, wherein the processor circuitry is configured to:

display the aggregation information corresponding to the target object account in an aggregation information floating window;

determine, in response to receiving a sliding operation performed on the aggregation information floating window, a sliding direction of the aggregation information floating window, the sliding direction being associated with a candidate group tag corresponding to a local object account, and determine a group corresponding to a group tag represented by the sliding direction to be the target group to which the target object account belongs.

19. A non-transitory machine-readable media, having instructions stored on the machine-readable media, the instructions configured to, when executed, cause a machine to:

obtain at least two dimensions of identity association information for at least one object account, the identity association information being for identifying identity information associated with the object account, and the at least two dimensions of identity association information being configured to be displayed in different user interfaces respectively;

aggregate the at least two dimensions of identity association information to obtain aggregation information;

display the aggregation information in a single aggregation information floating window via a user interface of the computing device;

detect a grouping operation performed on the aggregation information floating window via the user interface of the computing device, the grouping operation being for the aggregation information corresponding to a target object account in the at least one object account;

display selection controls for candidate groups in a peripheral region of the aggregation information floating window based on the grouping operation;

detect a group selection operation triggered on a target selection control via the user interface of the computing device;

in response to the group selection operation, determine a candidate group corresponding to the target selection control to be the target group to which the target object account belongs; and display the target group including the target object account via the user interface.

* * * * *